United States Patent
Kawasaki et al.

(10) Patent No.: US 7,848,186 B2
(45) Date of Patent: Dec. 7, 2010

(54) OBJECTIVE LENS AND METHOD OF MANUFACTURING OPTICAL PICKUP APPARATUS

(75) Inventors: Ryoichi Kawasaki, Gunma (JP); Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 428 days.

(21) Appl. No.: 11/750,711

(22) Filed: May 18, 2007

(65) Prior Publication Data
US 2007/0280058 A1 Dec. 6, 2007

(30) Foreign Application Priority Data
May 22, 2006 (JP) ............................. 2006-141913

(51) Int. Cl.
*G11B 7/00* (2006.01)
*G11B 7/135* (2006.01)
(52) U.S. Cl. ............. 369/44.14; 369/44.32; 369/112.23
(58) Field of Classification Search ............ 369/112.08, 369/112.13, 112.2, 112.23–112.26; 359/719
See application file for complete search history.

(56) References Cited

U.S. PATENT DOCUMENTS

| | | | | | |
|---|---|---|---|---|---|
| 5,453,962 | A | * | 9/1995 | Fujita et al. | 369/44.23 |
| 5,532,987 | A | * | 7/1996 | Fujita et al. | 369/44.24 |
| 5,864,525 | A | * | 1/1999 | Takeshita et al. | 369/44.23 |
| 2005/0007906 | A1 | * | 1/2005 | Horinouchi et al. | 369/44.37 |

FOREIGN PATENT DOCUMENTS

JP 8-075597 3/1996

* cited by examiner

*Primary Examiner*—Wayne R Young
*Assistant Examiner*—Aneeta Yodichkas
(74) *Attorney, Agent, or Firm*—Fish & Richardson P.C.

(57) ABSTRACT

An objective lens focusing light emitted from a light source onto an information surface of an optical disk, comprising: a first lens surface to be positioned on the light-source side; a second lens surface to be positioned on the optical-disc side; a first edge surface to be positioned on the light-source side, provided in an outer region of the first lens surface; and a second edge surface to be positioned on the optical-disc side, provided in an outer region of the second lens surface, a first optical axis of the first lens surface coinciding with a second optical axis of the second lens surface, the first optical axis and the second optical axis being orthogonal to the second edge surface.

3 Claims, 28 Drawing Sheets

| Type | JUDGMENT | REASON FOR JUDGMENT |
|---|---|---|
| A | OK | OPTICAL AXES OF SURFACES L1 AND L2 COINCIDE WITH INCIDENT LIGHT OPTICAL AXIS Z WITH SMALL ABERRATION |
| B | NG | LENS OPTICAL AXIS X TILTS WITH RESPECT TO INCIDENT LIGHT OPTICAL AXIS Z WHEN EDGE SURFACE S' IS PLACED ON LENS RECEIVING SURFACE P', INDUCING COMA |
| C | OK | THE SAME AS TYPE A |
| D | NG | OPTICAL AXIS OF LENS SURFACE L1 TILTS WITH RESPECT TO INCIDENT LIGHT OPTICAL AXIS Z, INDUCING COMA |
| E | NG | OPTICAL AXIS OF LENS SURFACE L1 TILTS WITH RESPECT TO INCIDENT LIGHT OPTICAL AXIS Z, INDUCING COMA |

FIG. 6

--Prior Art--
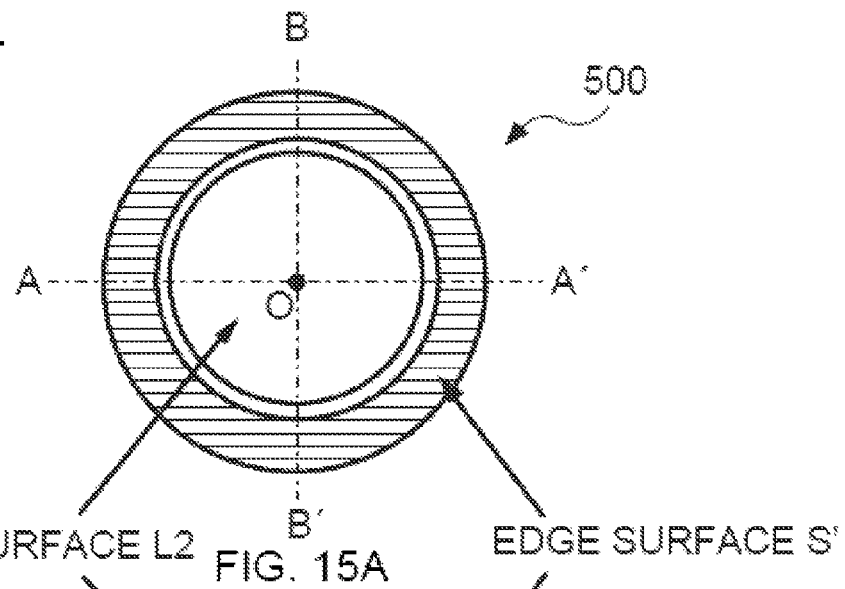
LENS SURFACE L2    FIG. 15A    EDGE SURFACE S'
--Prior Art--
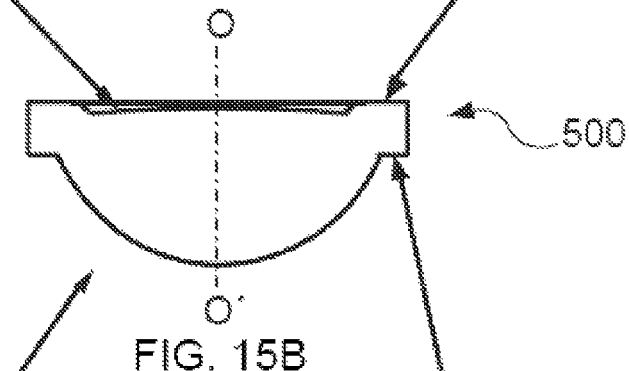
FIG. 15B
LENS SURFACE L1    EDGE SURFACE S
--Prior Art--
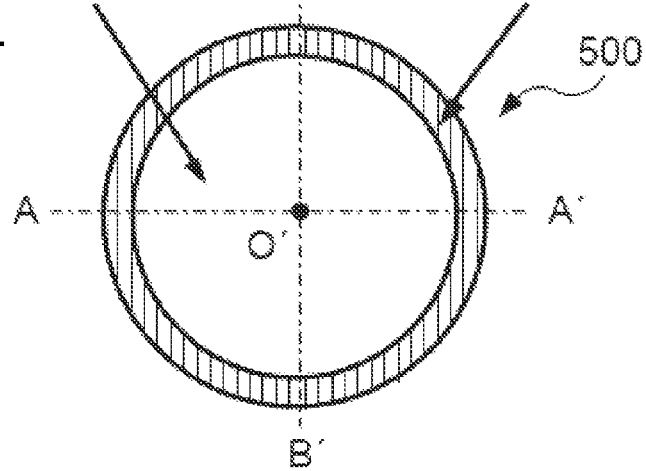
FIG. 15C --Prior Art--

--Prior Art--

--Prior Art--

--Prior Art--

--Prior Art--

--Prior Art--

| Type | JUDGMENT | REASON FOR JUDGMENT |
|---|---|---|
| A | OK | OPTICAL AXES OF SURFACES L1 AND L2 COINCIDE WITH INCIDENT LIGHT OPTICAL AXIS Z WITH SMALL ABERRATION |
| B | OK | THE SAME AS ABOVE |
| C | NG | WHEN MOUNTED ON HOLDER, LENS SURFACES L1 AND L2 TILT WITH RESPECT TO BOTH RECEIVING SURFACE P AND INCIDENT LIGHT OPTICAL AXIS Z, INDUCING GREAT COMA |
| D | NG | OPTICAL AXIS OF LENS SURFACE L1 TILTS WITH RESPECT TO INCIDENT LIGHT OPTICAL AXIS Z, INDUCING COMA |
| E | NG | OPTICAL AXIS OF LENS SURFACE L2 TILTS WITH RESPECT TO INCIDENT LIGHT OPTICAL AXIS Z, INDUCING COMA |

FIG. 18

--Prior Art--

--Prior Art--

--Prior Art--

--Prior Art--

--Prior Art--

--Prior Art--

OBJECTIVE LENS AND METHOD OF MANUFACTURING OPTICAL PICKUP APPARATUS

CROSS-REFERENCE TO RELATED APPLICATION

This application claims the benefit of priority to Japanese Patent Application No. 2006-141913, filed May 22, 2006, of which full contents are incorporated herein by reference.

BACKGROUND OF THE INVENTION

1. Field of the Invention

The present invention relates to an objective lens and a method of manufacturing an optical pickup apparatus.

2. Description of the Related Art

<<Designing and Manufacturing of Lens>>

Lens Design Principle

An objective lens is known, for example, as a plastic molded lens or a glass molded lens mounted on an optical pickup apparatus, for focusing light emitted from a light source on an information surface of an optical disc. FIG. 15A is a top plan view of the objective lens 500 viewed from the side of the lens surface L2 thereof with a small curvature side the optical disc (from O side of the line O-O' of FIG. 5B), FIG. 15B is a sectional view of the objective lens 500 taken along the line A-A', and FIG. 15C is a top plan view of the objective lens 500 viewed from the side of the lens surface L1 thereof with a large curvature side the light source (from O' side of the line O-O' of FIG. 5B).

The lens surface L1 has, in an outer region thereof, a surface to be positioned on the light-source side (hereinafter, referred to as a source-side edge surface S), of an annular plane portion (hereinafter, referred to as an edge) having a thickness and having a normal direction that is substantially the same as the direction of the optical axis of the lens surface L1. The lens surface L2 has, in an outer region thereof, a surface to be positioned on the optical-disc side (hereinafter, referred to as a disc-side edge surface S') of the edge. The lens surface L2 is concaved relative to the disc-side edge surface S', so that the lens surface L2 is protected, for example, when the objective lens 500 being disposed on the disc-side edge surface S'.

The conventional objective lens 500 is generally designed such that the source-side edge surface S to be positioned on the lens surface L1 side is used as a mounting reference surface. For example, the tilt or the decentering of the lens surfaces L1 and L2 is adjusted by a lens molding die so that the aberration is within specification when incident light strikes at right angles with respect to the objective lens 500 on the source-side edge surface S. That is, the shape of the lens molding die is adjusted so that the optical axes of the lens surface L1 and L2 are orthogonal to the source-side edge surface S and so that the optical axis of the lens surface L1 coincide with the optical axis of the lens surface L2. No restrictions are generally imposed on the tilt of the disc-side edge surface S' relative to the source-side edge surface S, so that the tilt is formed as finished (see, e.g., Japanese Patent Application Laid-open Publication No. 8-075597 described below).

Lens Molding

Assume, for example, that five different types of objective lenses 500a to 500e have been formed as shown in FIGS. 16A to 16E, respectively, as a result of lens molding under the lens design principle described above.

The objective lens 500a of type A shown in FIG. 16A has the lens surfaces L1 and L2 whose optical axes are orthogonal to the source-side edge surface S and coincide with each other. The disc-side edge surface S' is parallel to the source-side edge surface S. In this case, one optical axis of the whole lens can be defined. This optical axis is hereinafter referred to as a lens optical axis X.

The objective lens 500b of type B shown in FIG. 16B has the lens surfaces L1 and L2 whose optical axes are orthogonal to the source-side edge surface S and coincide with each other. The disc-side edge surface S' is tilted with respect to the source-side edge surface S. In this case, the lens optical axis X can be defined.

The objective lens 500c of type C shown in FIG. 16C has the lens surfaces L1 and L2 whose optical axes coincide with each other and are orthogonal to the disc-side edge surface S'. The disc-side edge surface S' is tilted with respect to the source-side edge surface S. In this case, the lens optical axis X can be defined.

The objective lens 500d of type D shown in FIG. 16D has the lens surface L2 whose optical axis is orthogonal to the source-side edge surface S and the lens surface 1 whose optical axis is tilted with respect to the source-side edge surface S. The disc-side edge surface S' is parallel to the source-side edge surface S. In this case, on optical axis of the whole lens cannot be defined.

The objective lens 500e of type E shown in FIG. 16E has the lens surface L1 whose optical axis is orthogonal to the source-side edge surface S and the lens surface 2 whose optical axis is orthogonal to the disc-side edge surface S'. The optical axis of the lens surface L2 and the disc-side edge surface S' is tilted with respect to the source-side edge surface S. In this case, one optical axis of the whole lens cannot be defined.

Lens Inspection and Shipping

FIG. 17 depicts a configuration of a conventional lens inspection device 200. The lens inspection device 200 includes an inspection light source 210, an inspection lens holder 220, an inspection lens 230, a mirror 240, an interferometer 250, and a personal computer 260.

Since the source-side edge surface S of the objective lens 500 is used as the mounting reference surface as the lens design principle, a lens receiving surface P of the inspection lens holder 220 is arranged to confront the source-side edge surface S of the objective lens 500. An adjustment is made in advance so that the lens receiving surface P is orthogonal to an optical axis Z of incident light from the inspection light source 210 to the objective lens 500.

In the lens inspection device 200, inspection light to be applied from the inspection light source 210 to the lens surface L1 of the objective lens 500 housed in the inspection lens holder 220. As a result, the converged inspection light from the lens surface L2 of the objective lens 500 is converted via the inspection lens 230 into parallel light, an optical path of which in turn is changed in the direction by the mirror 240 to enter the interferometer 250 connected communicably to the personal computer. The interferometer 250 is e.g., a Fizeau or Twyman-Green type interferometer, etc. capable of measuring wavefront aberration and causes incident light to interfere with reference light to generate interference fringes. The personal computer 260 provides a monitor display of whether the aberrations (astigmatism, coma, spherical aberration, etc.) determined by calculation based on information of interference fringes measured by the interferometer 250 are within specification. Thus, a person who performs the lens inspection can select the objective lens 500 conforming to the lens design principle by checking the monitor display of the personal computer 260.

As the result of the inspection of the five different types of lenses shown in FIGS. 16A to 16E, the objective lens 500a of type A (see FIG. 16A) and the objective lens 500b of type B (see FIG. 16B) are selected as shown in FIG. 18. That is, the objective lenses 500a and 500b are selected as conforming to the lens design principle described above, the lens optical axes X thereof capable of being defined, on the premise that the optical axes of the lens surfaces L1 and L2 are orthogonal to the source-side edge surface S and coincide with each other.

<<Optical Pickup Apparatus Assembly Process>>

Referring to FIG. 19, in a conventional assembly process of the optical pickup apparatus mounted with the objective lens 500a or the 500b selected in the lens inspection process described above, an optical block assembly step (S190), a rising mirror reflected light optical axis tilt adjustment step (S191), an actuator assembly step (S192), an actuator mounting step (S193), an actuator tilt adjustment step (S194), and an actuator tilt readjustment step (S195) are performed in sequence. The steps will hereinafter be described.

Optical Block Assembly Step (S190)

The optical block 300 is assembled, as shown in FIG. 20, by a holder 321 fitted with a semiconductor laser element 320 (hereinafter, abbreviated to LD), a diffraction grating 330, a beam splitter 340, a collimator lens 350, a rising mirror 360, and a sensor lens, a photodetector, etc. that are not shown, disposed on a metal or plastic housing 310.

The LD 320 is an element emitting laser light with a predetermined wavelength in response to a control voltage applied from a laser driving circuit (not shown). The diffraction grating 330 is an element diffracting laser light from the LD 320. Laser light diffracted by the diffraction grating 330 passes through the beam splitter 340 to enter the collimator lens 350. The collimator lens 350 is a lens converting laser light into parallel light. The rising mirror 360 is a mirror reflecting parallel light from the collimator lens 350 to allow the light to enter the objective lens 500 (not shown).

Rising Mirror Reflected Light Optical Axis Tilt Adjustment Step (S191)

The LD 320 of the optical block 300 is activated and the position adjustment of the LD 320 in the optical block 300 is performed as follows so that the optical axis Z of the reflected light from the rising mirror 360 becomes orthogonal to a reference surface Q.

First, as shown in FIG. 21, a tilt adjustment of shafts 370a and 370b to which the optical block 300 is fitted in a subsequent step, is performed by using an optical axis adjusting device 400. The tilt adjustment of the shafts 370a and 370b is performed by rotationally adjusting a biaxial goniostage 410 so that an image measured by an autocollimator 420 for a parallel-plate mirror 440 placed on the shafts 370a and 370b lies at an origin point of a monitor 430. As a result, the reference surface Q defined by a surface of the parallel-plate mirror 440 is positioned at an origin point of the autocollimator 420.

Next, as shown in FIG. 22, the optical block 300 is fitted to the shafts 370a and 370b, with pins of an LD position adjusting jig 450 being pressed against an aperture of the LD holder 321 shown in FIG. 20. The LD 320 is then activated and a stage mounted with the LD position adjusting jig 450 is adjusted so that the image of the autocollimator 420 lies at the origin point of the monitor 430, thus the position of the LD 320 in the optical block 300 being adjusted. After the position adjustment of the LD 320, the LD holder 321 is adhesively fixed to the housing 310. As a result, the optical axis Z of reflected light from the rising mirror 360 of light emitted from the LD 320 is set to become orthogonal to the reference surface Q.

Actuator Assembly Step (S192)

An actuator 600 is assembled, as shown in FIGS. 23A to 23C, which has at least a lens holder holding the objective lens 500 such that the edge surface S thereof is disposed on the lens receiving surface and that drives the objective lens 500. FIG. 23A is a top plan view of the actuator 600 viewed from a focusing direction orthogonal to both a tangential direction and a radial direction, FIG. 23B is a side view of the actuator 600 viewed from the radial direction, and FIG. 23C is a sectional view of the actuator 600 viewed from the radial direction. As used herein, the tangential direction is a direction orthogonal to the optical axis X of the objective lens 500 and a direction of a tangent of information tracks formed concentrically or spirally with a rotation center as a base point on an optical disc (not shown). The radial direction is a direction orthogonal to the optical axis X of the objective lens 500 and a direction of a radius of the optical disc. The focusing direction is a direction parallel to the optical axis X of the objective lens 500.

The actuator 600 has at least the lens holder 630 holding the objective lens 500, magnets 650a and 650b, tracking coils 632a to 632d, a focusing coil 634, suspension wires 640a to 640d, a suspension holder 660, and an actuator substrate 670, on a yoke base 610.

The lens holder 630 is in the shape of a rectangular box with a bottom opened and holds the objective lens 500 arranged on the upper surface side thereof by means of fixing, fitting, etc. It can be, e.g., a bobbin, etc. in the shape of a circular or polygonal cylinder forming a coil with electric wires wound.

The lens holder 630 is secured by the suspension wires 640a to 640d via the suspension holder 660 to the actuator substrate 670 by means of solders 672. That is, the lens holder 630 is resiliently retained on the actuator substrate 670 by resilient force of the suspension wires 640a to 640d. The lens holder 630 is driven in a tracking direction and a focusing direction by magnetic actions of the magnets 650a, 650b, etc., as a result of driving of the focusing coil 634 and the tracking coils 632a to 632d.

The yoke base 610 is provided with three skew screw holes 620a to 620c to be used for mounting the yoke base 610 on the optical block 300. The yoke base 610 is further provided with a spherical seat 675 for adjusting the tilt of the actuator 600 with respect to the optical block 300.

Actuator Mounting Step (S193)

As shown in FIG. 24, the yoke base 610 of the actuator 600 is screwed to the housing 310 of the optical block 300 by using three skew screws 625a to 625c. By disposing a spring between the housing 310 and a thread, the skew screw 625a received in the skew screw hole 620a provides a resilient support for the actuator 600 on the housing 310, and can be a fulcrum for the tilt adjustment of the actuator 600. The skew screw 625b not shown received in the skew screw hole 620b serves to adjust the tilt of the actuator 600 in the radial direction, and the skew screw 625a received in the skew screw hole 620c serves to adjust the tilt of the actuator 600 in the tangential direction.

Actuator Tilt Adjustment Step (S194)

In the state where the actuator 600 is simply screwed to the housing 310 in the mounting step (S193) of the optical block 300, the lens optical axis X of the objective lens 500 cannot necessarily be orthogonal to the reference surface Q. If the tilt of the lens optical axis X relative to the orthogonal direction of the reference surface Q increases, then the aberration becomes large, resulting in deteriorated quality of a focus error signal or a tracking error signal, making it infeasible to provide servo control as well as to observe jitter corresponding to a RF signal.

Thus, as shown in FIG. 25, by fastening the skew screws 625b to 625c based on a display of the monitor 430 of the autocollimator 420, an adjustment can be made for reducing as much as possible the tilt of the lens optical axis X relative to the orthogonal direction of the reference surface Q. More specifically, by means of the optical axis adjusting device 400 shown in FIG. 21, the tilt of the surface defined by the shafts 370a and 370b is so set initially as to correspond to the origin point of the monitor 430 of the autocollimator 420. The optical block 300 screwed to the actuator 600 is then fitted to the shafts 370a and 370b so that the laser light from the autocollimator 420 is applied to the disc-side edge surface S' of the objective lens 500, consequently checking the tilt of reflected light from the disc-side edge surface S'. The tilt of the actuator 600 is then adjusted by turning the skew screws 625b and 625c with a screwdriver 460 so that an image of the reflected light lies at the origin point of the monitor 430. As a result, the lens optical axis X of the objective lens 500 becomes substantially orthogonal to the reference surface Q.

If the autocollimator 420 is able to measure the tilt of the source-side edge surface S in the actuator tilt adjustment step (S194), then the tilt of the actuator 600 can be adjusted so that the source-side edge surface S and the reference surface Q become parallel to each other. However, the source-side edge surface S is in contact with the lens receiving surface P of the lens holder 220 and does not appear on the surface of the lens holder 220, with the result that light from the autocollimator 420 cannot be applied to the source-side edge surface S.

Even though part of the lens receiving surface P of the lens holder 220 is provided with a through-hole to allow light from the autocollimator 420 to enter from the lens surface L1 side, the presence of the rising mirror 360 will interfere with the measurement. Accordingly, merely making the tilt adjustment of the actuator 600 based on the disc-side edge surface S' may result in a coarse adjustment to roughly correct the great tilt when the actuator 600 is mounted on the optical block 300, which will necessitate a next actuator tilt readjustment step (S195).

Actuator Tilt Readjustment Step (S195)

After the completion of the tilt adjustment step (S194) of the actuator 600, as shown in FIG. 26, the optical pickup apparatus in the form of the actuator 600 fitted with the optical block 300 is mounted with a photodetector (not shown). A spindle motor is then rotated with an optical disc 700 to activate the LD 320. At that time, the position of the photodetector (not shown), etc., is adjusted so that the level or the symmetry of the focus error signal is within specification.

Afterward, a focus servo control is provided to focus a spot on the information surface of the optical disc 700, thereby enabling the tracking error signal to be observed. The position of the photodetector (not shown) is then finally adjusted so that the symmetry of the tracking error signal is within specification. Subsequently, a tracking servo control is provided to cause the spot to follow the tracks of the optical disc 700, thereby enabling the jitter corresponding to the RF signal to be observed. If the jitter is within specification, then the actuator 600 including the photodetector (not shown) is adhesively fixed to the housing 310. If the jitter is out of specification, then the skew screws 625b and 625c are adjusted to try to reduce the jitter. As a result, if the jitter is still out of specification, the optical pickup apparatus is handled as a defective item.

The jitter is measured as a jitter value by means of a jitter meter (not shown). Therefore, it is difficult to directly know which one of the skew screws 625b and 625c is to be turned to which direction, with the result that a jitter bottom is to be found out by observing how the jitter value fluctuates by turning one of the skew screws 625B and 625c to a small extent, which is an extremely troublesome operation. Therefore a method of adjusting the skew screws 625b and 625c is proposed, which is observing a spot itself of a main beam of outgoing light of the objective lens 500 by a microscope.

For example, when the optical axis X of the objective lens 500 is parallel to the incident light optical axis Z, as shown in FIG. 27A, a spot is a circle or an ellipse having point symmetry. On the contrary, when the optical axis X of the objective lens 500 tilts with respect to the incident light optical axis Z, a coma will occur and hence, as shown in FIG. 27B, the spot comes to have a large side lobe in the direction of tilt of the lens. Thus, by checking the state of the side lobe, it is possible to find which one of the skew screws 625b and 625c is to be turned to which direction.

Up until now, the objective lens 500 has been designed and manufactured using the source-side edge surface S thereof as the mounting reference surface in conformity with the lens design principle described above. Accordingly, the objective lens 500 shipped through the lens inspection from a lens manufacturer becomes either the objective lens 500a of type A (see FIG. 16A) or the objective lens 500b of type B (see FIG. 16B). The result of the tilt adjustment of the actuator 600 will hereinafter be described separating the case of the objective lens 500a of type A and the case of the objective lens 500b of type B. In the following symbols, "∥" is representative of being parallel, "⊥" is representative of being orthogonal, and "≠" is representative of being not parallel.

In the case of the objective lens 500a of type A, the disc-side edge surface S' and the source-side edge surface S are parallel to each other, with the lens optical axis X being orthogonal to the source-side edge surface S. By performing the rising mirror reflected light optical axis tilt adjustment step (S191), the rising mirror reflected light optical axis Z becomes orthogonal to the reference surface Q, while by performing the tilt adjustment step (S194) of the actuator 600, the disc-side edge surface S' becomes parallel to the reference surface Q. As a result, as shown in FIG. 28, the lens optical axis X and the rising mirror reflected light optical axis Z become parallel to each other, whereupon the aberration of outgoing light from the objective lens 500a can be within specification. Since the autocollimator 420 cannot measure aberration, the objective lens 500a of type A with a small aberration proceeds intactly to the next actuator tilt readjustment step (S195). In the actuator tilt readjustment step (S195), the optical pickup apparatus mounted with the objective lens 500a of type A has an initial jitter value falling within specification and is selected as a non-defective item without being subjected to the skew readjustment.

i) Objective lens of type A→disc-side edge surface S' ∥ source-side edge surface S
  ii) Lens design principle→lens optical axis X ⊥ source side edge surface S
  iii) LD position adjustment→rising mirror reflected light optical axis Z ⊥ reference surface Q iv) Actuator tilt adjustment→disc-side edge surface S' ∥ reference surface Q ∴ Lens optical axis X ∥ rising mirror reflected light optical axis Z On the other hand, in the case of the objective lens 500b of type B, the disc-side surface S' and the source-side edge surface S are not parallel to each other, with the lens optical axis X being orthogonal to the source-side edge surface S. By performing the rising mirror reflected light optical axis tilt adjustment step (S191), the rising mirror reflected light optical axis Z becomes orthogonal to the reference surface Q, while by performing the tilt adjustment step (S194) of the actuator 600, the disc-side edge surface S' becomes parallel to the reference surface Q. As a result, the source-side edge surface S tilts relative to the reference surface Q, and the lens optical axis X does not become orthogonal to the reference surface Q. That is, as shown in FIG. 29, the lens optical axis X of the objective lens 500 does not become parallel to the rising mirror reflected light optical axis Z, resulting in a tilted state.

i) Objective lens of type B→disc-side edge surface S'≠source-side edge surface S ii) Lens design principle→lens optical axis X ⊥ source-side edge surface S iii) LD position adjustment→rising mirror reflected light optical axis Z ⊥ reference surface Q iv) Actuator tilt adjustment→disc-side edge surface S' ∥ reference surface Q ∴ Lens optical axis X≠rising mirror reflected light optical axis Z Thus, in the case of the objective lens 500b of type B, performing only the tilt adjustment step (S194) of the actuator 600 by the autocollimator 420 results in the lens optical axis X uncoincident with the rising mirror reflected light optical axis Z, allowing the occurrence of an aberration which is out of specification. Sine the autocollimator 420 cannot measure aberration, the objective lens 500b of type B with a large aberration proceeds intactly to the next actuator tilt readjustment step (S195). In the actuator tilt readjustment step (S195), the optical pickup apparatus mounted with the objective lens 500b of type B has an initial jitter value which is out of specification, resulting in a need to perform the skew readjustment.

In this manner, even though the objective lens 500 conforms to the lens design principle, due to no restrictions imposed on the tilt of the disc-side edge surface S' relative to the source-side edge surface S, the objective lens 500a of type A having the source-side edge surface S and the disc-side edge surface S' that are parallel to each other or the objective lens 500b of type B having the source-side edge surface S and the disc-side edge surface S' that are not parallel to each other, may be shipped.

Thus, in the actuator tilt adjustment step (step S194) of the assembly process of the optical pickup apparatus mounted with the objective lens 500a or the objective lens 500b, the tilt of the actuator 600 is adjusted using the disc-side edge surface S' since the tilt of the source-side edge surface S cannot be measured by the autocollimator 420. At that time, in the case of the objective lens 500b of type B, the actuator tilt readjustment step (S195) has to necessarily be performed, as in the case of the objective lens 500a of type A, taking it into consideration that the lens optical axis X and the rising mirror reflected light optical axis Z cannot be parallel to each other. In this case, the actuator tilt readjustment step (S195) results in a troublesome step of the skew adjustment based on the observation of the jitter value or of the spot shape, thereby increasing a manufacturing cost of the optical pickup apparatus.

SUMMARY OF THE INVENTION

In order to overcome the above deficiencies, according to a major aspect of the present invention there is provided an objective lens focusing light emitted from a light source onto an information surface of an optical disc, comprising: a first lens surface to be positioned on the light-source side; a second lens surface to be positioned on the optical-disc side; a first edge surface to be positioned on the light-source side; provided in an outer region of the first lens surface; and a second edge surface to be positioned on the optical-disk side, provided in an outer region of the second lens surface, a first optical axis of the first lens surface coinciding with a second optical axis of the second lens surface, the first optical axis and the second optical axis being orthogonal to the second edge surface.

The above and other features of the present invention will become apparent from the following descriptions of the accompanying drawings and of this specification.

BRIEF DESCRIPTION OF THE DRAWINGS

For more thorough understanding of the present invention and advantages thereof, the following description should be read in conjunction with the accompanying drawing, in which:

FIG. 6 depicts lens inspection results of the five different types of objective lenses according to the present invention;

FIG. 15A is a plan view of a conventional objective lens viewed from one lens surface side thereof;

FIG. 15B is a sectional view of the conventional objective lens;

FIG. 15C is a plan view of the conventional objective lens viewed from the other lens surface side thereof;

FIG. 18 depicts lens inspection results of the conventional five different types of objective lenses;

DETAILED DESCRIPTION OF THE INVENTION

At least the following details will become apparent from descriptions of this specification and of the accompanying drawings.

<<Designing and Manufacturing of Lens>>

An objective lens 100 of the present invention is mainly intended to be mounted on a lens holder of an optical pickup apparatus and is a plastic molded lens or a glass molded lens focusing laser light emitted from a semiconductor laser element (light source) on an information surface of an optical disc.

Lens Design Principle

Figure 1:
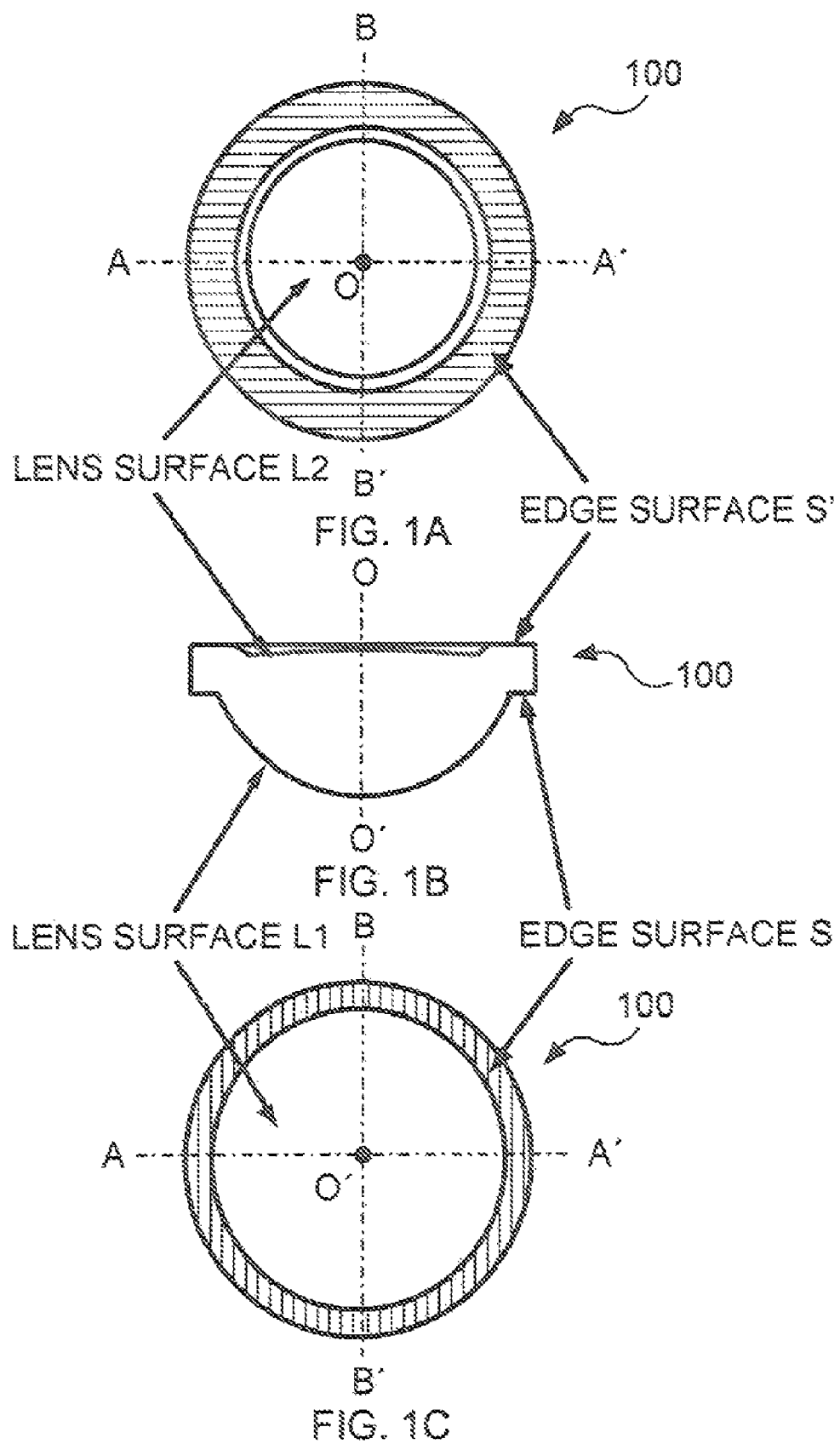
FIG. 1A is a plan view of an objective lens according to the present invention viewed from the lens surface side thereof.
FIG. 1B is a sectional view of the objective lens according to the present invention.
FIG. 1C is a plan view of the objective lens according to the present invention viewed from the other lens surface side thereof.

FIG. 1A is a plan view of the objective lens 100 viewed from the side of one lens surface L2 having a small curvature, (the side of "a second lens surface" of the present invention, which is O-side of a line O-O'), FIG. 1B is a sectional view of the objective lens 100 taken along line A-A', and FIG. 1C is a plan view of the objective lens 100 viewed from the side of the other lens surface L1 having a large curvature (the side of "a first lens surface" of the present invention, which is O'-side of the center axis O-O').

The lens surface L1 has, in an outer region thereof, a surface to be positioned on the light-source side ("a first edge surface" of the present invention; hereinafter, referred to as a source-side edge surface S), of an annular plane portion (hereinafter, referred to as an edge) having a thickness and having a normal direction that is substantially the same as the direction of the optical axis of the lens surface L1. The lens surface L2 has, in an outer region thereof, a surface to be positioned on the optical-disc side ("a second edge surface" of the present invention; hereinafter, referred to as a disc-side edge surface S') of the edge. The lens surface L2 is concaved relative to the disc-side edge surface S', so that the lens surface L2 is protected, for example, when disposing the objective lens 100 on the disc-side edge surface S' thereof.

The conventional objective lens 500 is designed using the source-side edge surface S thereof to be positioned on the lens surface L1 side as a mounting reference surface. In the present invention, however, the objective lens 100 is designed using the disc-side edge surface S' to be positioned on the lens surface L2 side as the mounting reference surface. For example, the tilt or the decentering of the lens surfaces L1 and L2 is adjusted by a lens molding die so that the aberration is within specification when incident light to the objective lens 100 strikes at right angle on the disc-side edge surface S'. That is, the shape of the lens molding die is adjusted so that the optical axis of the lens surface L1 and the optical axis of the lens surface L2 are orthogonal to the disc-side edge surface S' and that the optical axes of the lens surfaces L1 and L2 coincide with each other. No restrictions are generally imposed on the tilt of the disc-side edge surface S' relative to the source-side edge surface S, so that the tilt is formed as finished.

Figure 3:
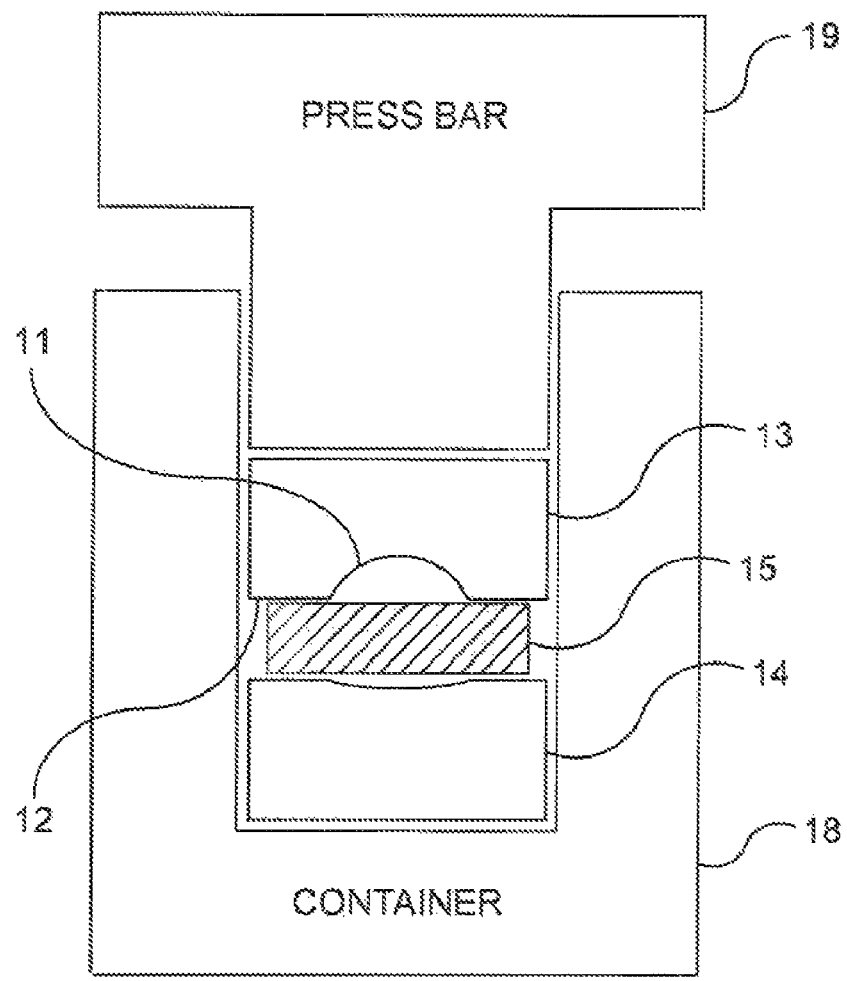
FIG. 3 depicts a lens molding die in a case where the objective lens according to the present invention is a glass molded lens.

The above lens molding die is configured, for example when the objective lens 100 is a glass molded lens, to include a die 13 having a mirror surface portion with a large curvature corresponding to the lens surface L1, and a die 14 having a mirror surface portion with a small curvature corresponding to the lens surface L2, as shown in FIG. 3. The dies 13 and 14 having a lens glass material 15 sandwiched therebetween are disposed within a container 18 and a molding pressure is applied to the lens glass material 15 by a press bar 19, so that a desired lens shape is obtained. For this reason, adjustment of the dies 13 and 14 is performed to make the obtained objective lens 100 to conform to the lens design principle described hereinabove.

Figure 4:
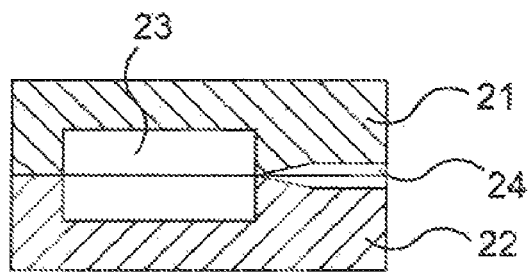
FIG. 4 depicts a lens molding die in a case where the objective lens according to the present invention is a plastic molded lens.

When the objective lens 100 is a plastic molded lens, an injection mold is used that includes dies 21 and 22 to form a cavity as a closed space as shown in FIG. 4, into which molten resin is injected from a sprue 24, so that the plastic molded lens is obtained. For this reason, adjustment of the dies 21 and 22 is performed to make the obtained objective lens 100 to conform to the lens design principle described hereinabove.

Lens Molding

Assume, for example, that five different types of objective lenses 100a to 100e have been formed as shown in FIGS. 2A to 2E, respectively, as a result of lens molding under the lens design principle described above.

Figure 2:
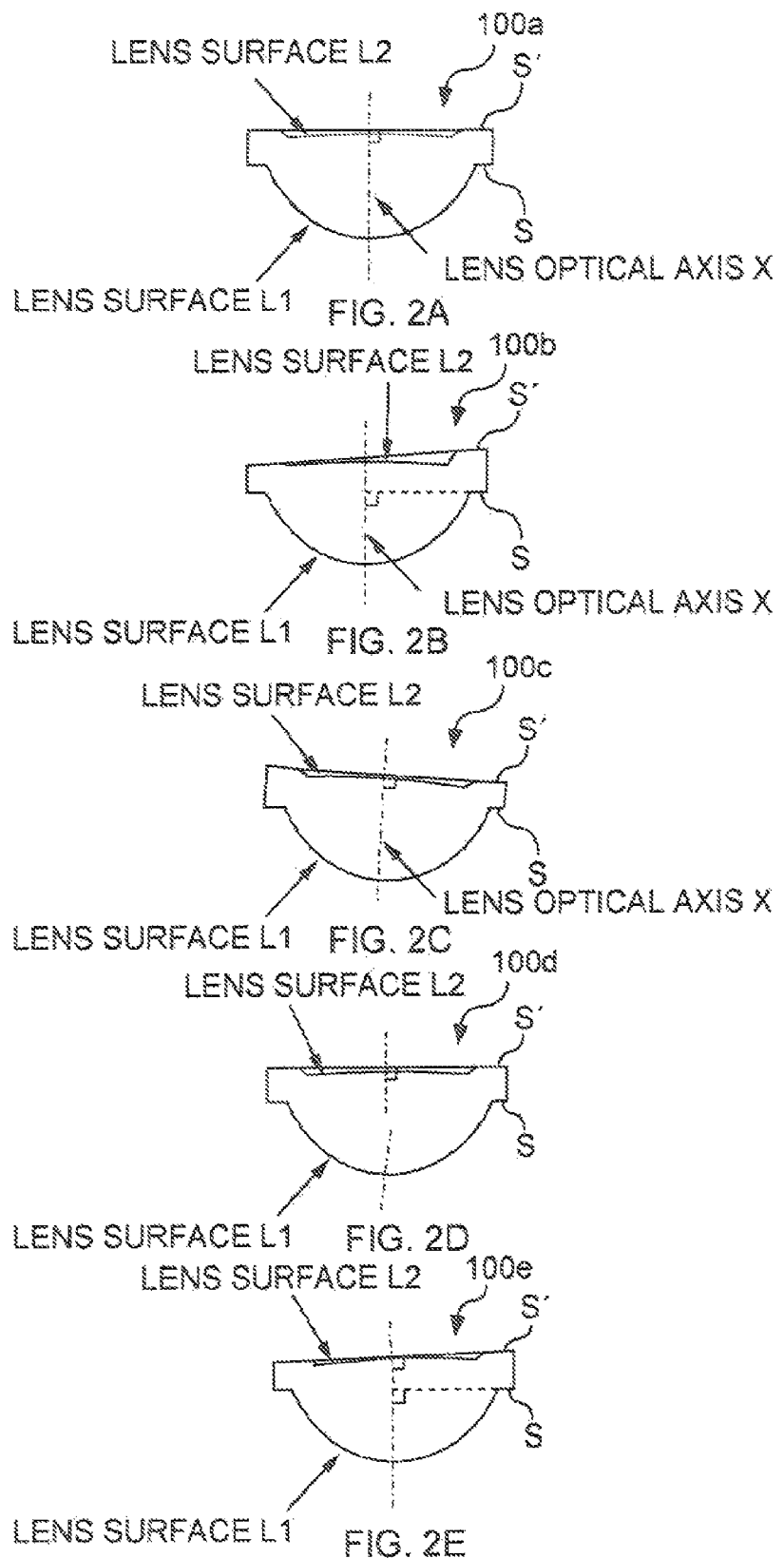
FIG. 2A depicts an objective lens obtained as a result of lens molding according to the present invention.
FIG. 2B depicts another objective lens obtained as a result of lens molding according to the present invention.
FIG. 2C depicts still another objective lens obtained as a result of lens molding according to the present invention.
FIG. 2D depicts yet another objective lens obtained as a result of lens molding according to the present invention.
FIG. 2E depicts a further objective lens obtained as a result of lens molding according to the present invention.

The objective lens 100a of type A shown in FIG. 2A has the lens surfaces L1 and L2 whose optical axes are orthogonal to the disc-side edge surface S' and coincide with each other. The source-side edge surface S is parallel to the disc-side edge surface S'. In this case, one optical axis of the whole lens can be defined. The optical axis thereof is hereinafter referred to as a lens optical axis X.

The objective lens 100b of type B shown in FIG. 2B has the lens surfaces L1 and L2 whose optical axes are orthogonal to the source-side edge surface S and coincide with each other. The source-side edge surface S is tilted with respect to the disc-side edge surface S'. In this case, the lens optical axis X can be defined.

The objective lens 100c of type C shown in FIG. 2C has the lens surfaces L1 and L2 whose optical axes coincide with each other and are orthogonal to the disc-side edge surface S'. The source-side edge surface S is tilted with respect to the disc-side edge surface S'. In this case, the lens optical axis X can be defined.

The objective lens 100d of type D shown in FIG. 2D has the lens surface L2 whose optical axis is orthogonal to the disc-side edge surface S' and the lens surface 1 whose optical axis is tilted with respect to the disc-side edge surface S'. The source-side edge surface S is parallel to the disc-side edge surface S'. In this case, one optical axis of the whole lens cannot be defined.

The objective lens 100e of type E shown in FIG. 2E has the lens surface L1 whose optical axis is orthogonal to the source-side edge surface S and the lens surface 2 whose optical axis is orthogonal to the disc-side edge surface S'. The optical axis of the lens surface L1 and the source-side edge surface S is tilted with respect to the disc-side edge surface S'. In this case, one optical axis of the whole lens cannot be defined.

Lens Inspection and Shipping

Figure 5:
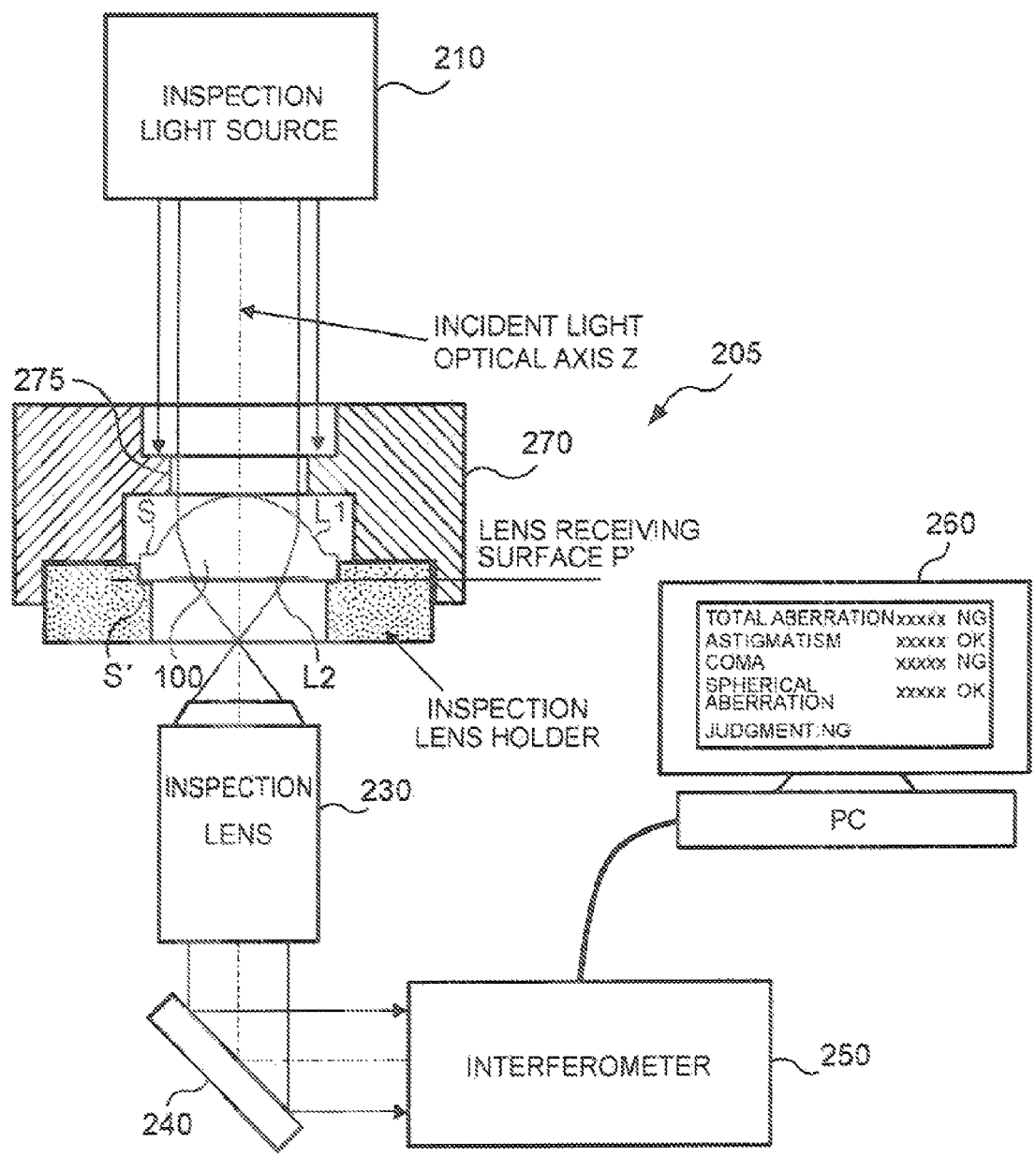
FIG. 5 depicts a configuration of a lens inspection device according to the present invention.

FIG. 5 depicts a configuration of a lens inspection device 205. The same reference numerals are imparted to the same constituent elements as those of the conventional lens inspection device 200 of FIG. 17.

Figure 17:
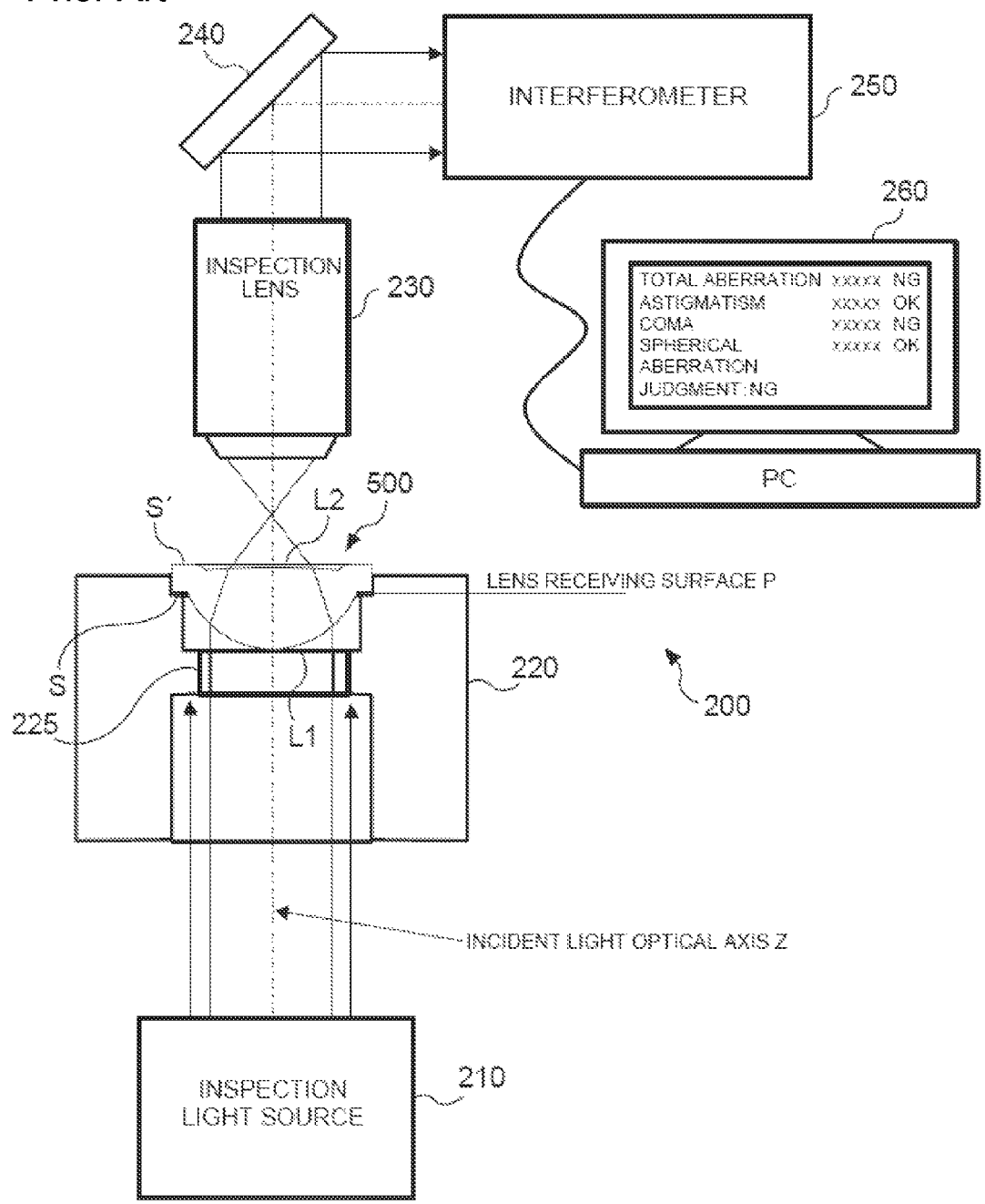
FIG. 17 depicts a configuration of a conventional lens inspection device.
Figure 19:
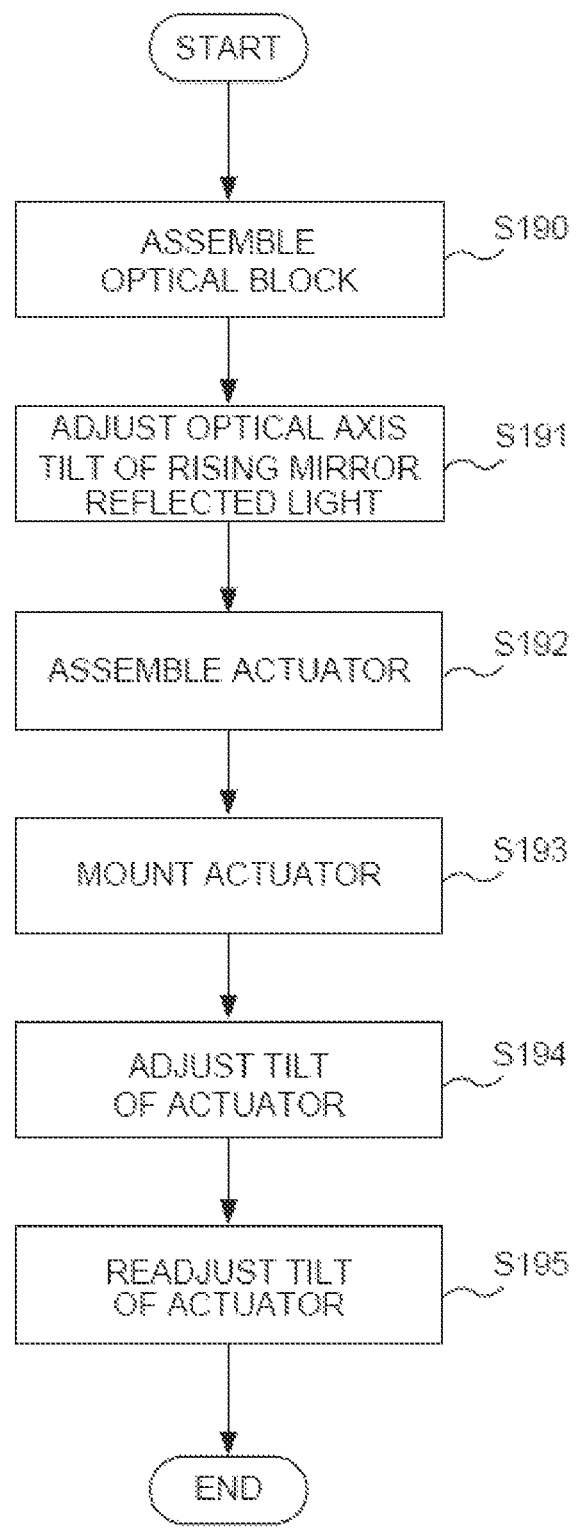
FIG. 19 is a flowchart of a conventional assembly process of an optical pickup apparatus.

The difference from the lens inspection device 200 of FIG. 17 lies in the objective lens 100 for a lens to be inspected, and in the arrangement of a lens receiving surface P' of an inspection lens holder 270. That is, since the disc-side edge surface S' of the objective lens 100 is used as the mounting reference surface in the lens design principle of the present invention, the lens receiving surface P' of the inspection lens holder 270 is arranged to confront the disc-side edge surface S' of the objective lens 100. Adjustment is made in advance so that the lens receiving surface P' is orthogonal to an optical axis Z of incident light to the objective lens 100 on the inspection lens holder 270 from the inspection light source 210.

The lens inspection device 205 causes light to be emitted from the inspection light source 210 to the lens surface L1 of the objective lens 100 housed in the inspection lens holder 270. As a result, light emitted from the lens surface L2 of the objective lens 100 is converted via the inspection lens 230 into parallel light, an optical path of which in turn is changed in the direction by the mirror 240 to enter the interferometer 250 connected communicably to the personal computer. The interferometer 250 is e.g., a Fizeau or Twyman-Green type interferometer, etc. capable of measuring wavefront aberration and causes incident light to interfere with reference light to generate interference fringes. The personal computer 260 provides a monitor display of whether the aberrations (astigmatism, coma, spherical aberration, etc.) determined by calculation based on interference fringes measured by the interferometer 250 are within specification. Thus, a person who performs the lens inspection can select the objective lens 100 conforming to the lens design principle by checking the monitor display of the personal computer 260.

As the result of the inspection by the lens inspection device 205 of the five different types of lenses shown in FIGS. 2A to 2E, the objective lens 100a of type A (see FIG. 2A) and the objective lens 100c of type C (see FIG. 2C) are selected as shown in FIG. 6. That is, the objective lens 100a and 100c are selected as conforming to the lens design principle described above, the lens optical axes X thereof capable of being defined, on the premise that the optical axes of the lens surfaces L1 and L2 are orthogonal to the disc-side edge surface S' and coincide with each other.

<<Optical Pickup Apparatus Assembly Process>> the optical pickup apparatus of the present invention supports e.g., read-only optical discs such as "CD-ROM" and "DVD-ROM", etc., recordable optical discs such as "CD-R", "DVD-R", and "DVD+R" (registered trademark), etc., and writable/erasable or rewritable optical discs such as "CD-RW", "DVD-RW", "DVD+RW" (registered trademark), "DVD-RAM", "HD-DVD", and "Blu-ray Disc" (registered trademark), etc. An optical disc apparatus having the optical pickup apparatus is incorporated into audio equipment such as various types of personal computers and CD/DVD players etc.

Figure 7:
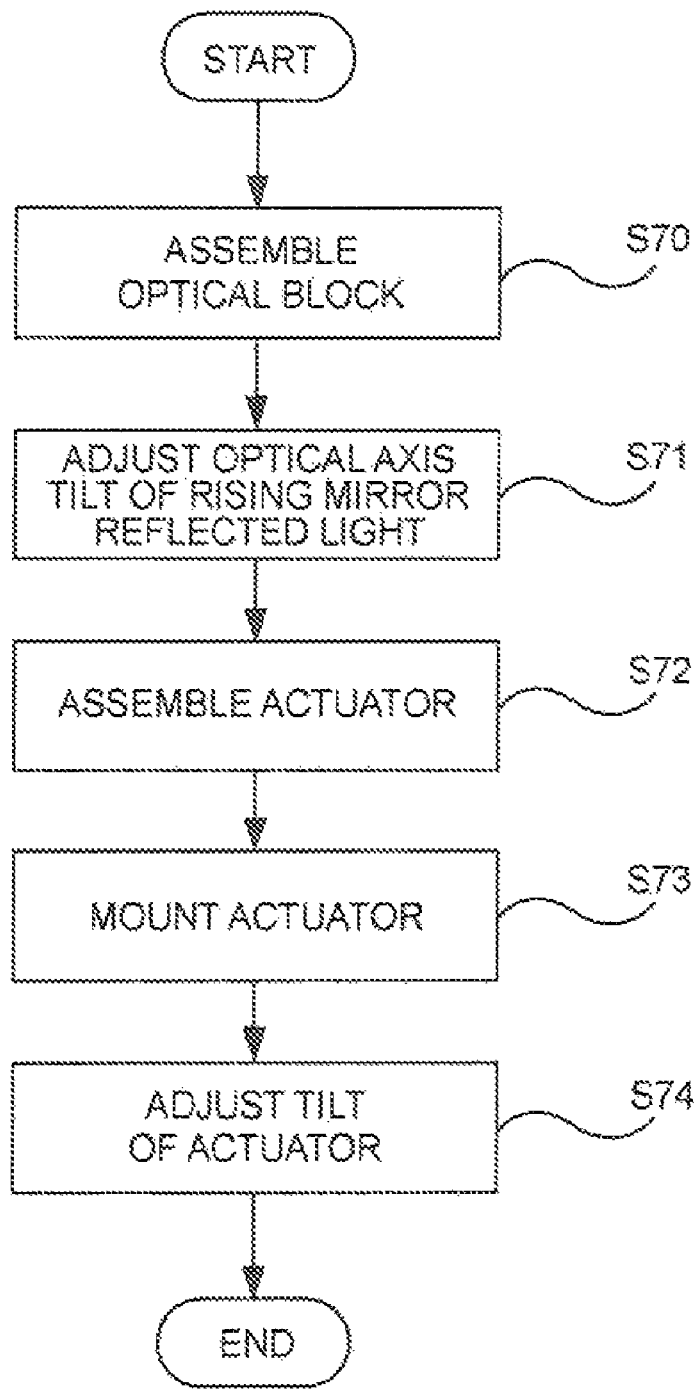
FIG. 7 is a flowchart of an assembly process of an optical pickup apparatus according to the present invention.

Referring to FIG. 7, in an assembly process of the optical pickup apparatus mounted with the objective lens 100a or the 100c selected in the lens inspection process described above an optical block assembly step (S70), a rising mirror reflected light optical axis tilt adjustment step (S71), an actuator assembly step (S72), an actuator mounting step (S73), and an actuator tilt adjustment step (S74) are performed in sequence. The steps will hereinafter be described.

Optical Block Assembly Step (S70)

Figure 20:
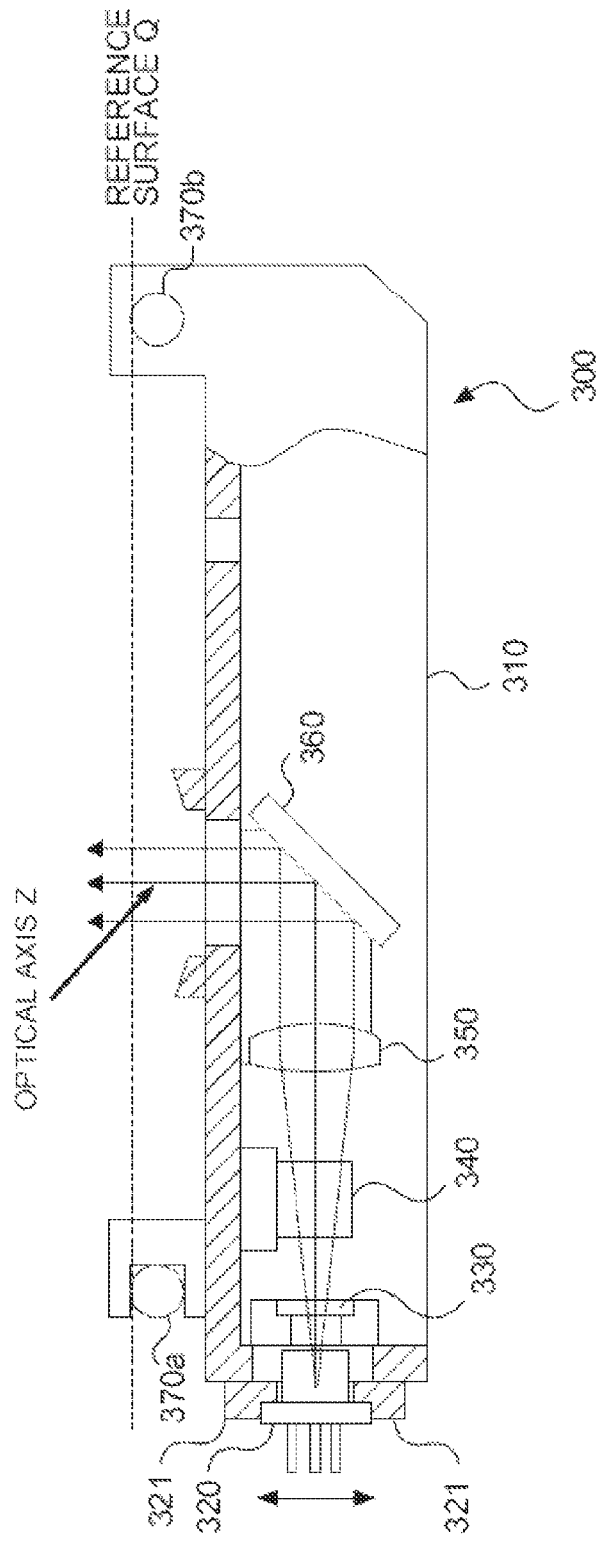
FIG. 20 an explanatory view of an optical block assembly step.

The optical block assembly step (S70) of the present invention is the same as the conventional step (S190) described earlier with reference to FIG. 20. That is, as shown in FIG. 20, the optical block 300 is finally assembled so that laser light emitted from the LD 320 enters the lens surface L1 of the objective lens 100. Without being limited to the configuration of the optical block 300 shown in FIG. 20, there may be other and exclusive configurations in which a beam expander (not shown) including a concave lens and a convex lens is disposed on an optical path from the collimator lens 350 to the rising mirror 360, and in which a sensor lens or a photodetector (not shown) is disposed on an optical path of return light from the optical disc reflected by the beam splitter 340.

Rising Mirror Reflected Light Optical Axis Tilt Adjustment Step (S71)

Figure 21:
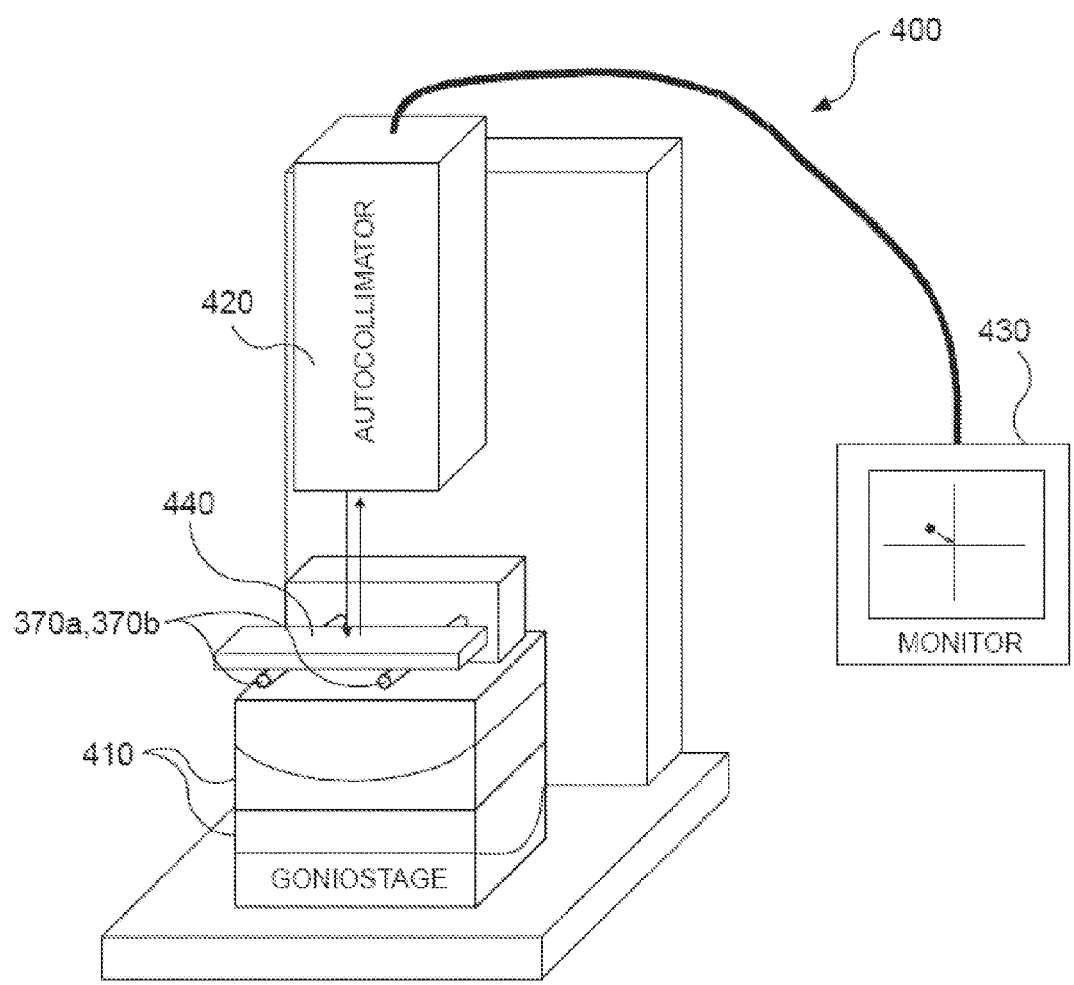
FIG. 21 is an explanatory view of an optical axis tilt adjustment step of rising mirror reflected light.
Figure 22:
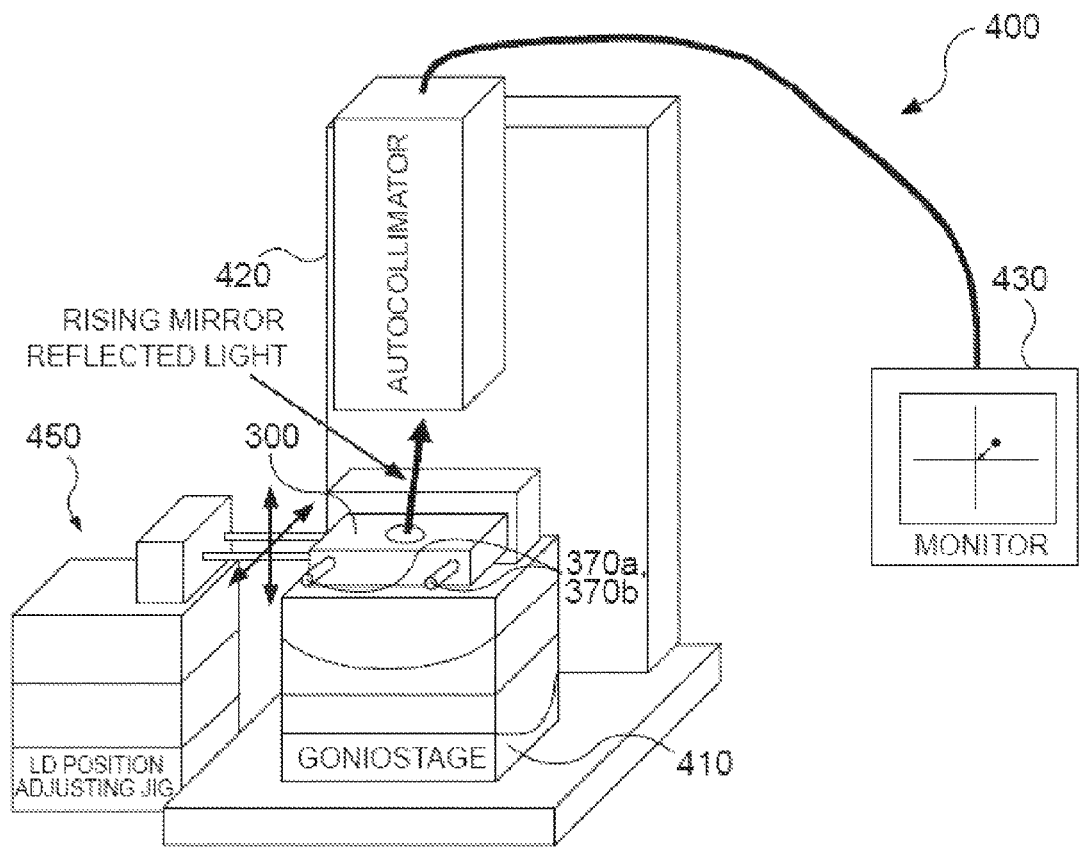
FIG. 22 is another explanatory view of the optical axis tilt adjustment step of rising mirror reflected light.

The rising mirror reflected light optical axis tilt adjustment step (S71) of the present invention is the same as the conventional step (S191) described earlier with reference to FIGS. 21 and 22. That is, after adjusting the tilt of the shafts 370a and 370b to define the reference surface Q, the optical block 300 is fitted to the shafts 370a and 370b so that setting is made to allow the optical axis of light incident on the lens surface L1 of the objective lens 100 from the optical block 300, more specifically, the optical axis Z of rising mirror reflected light of laser light emitted from the LD 320, to be orthogonal to the reference surface Q.

Actuator Assembly Step (S72)

Figure 23A:
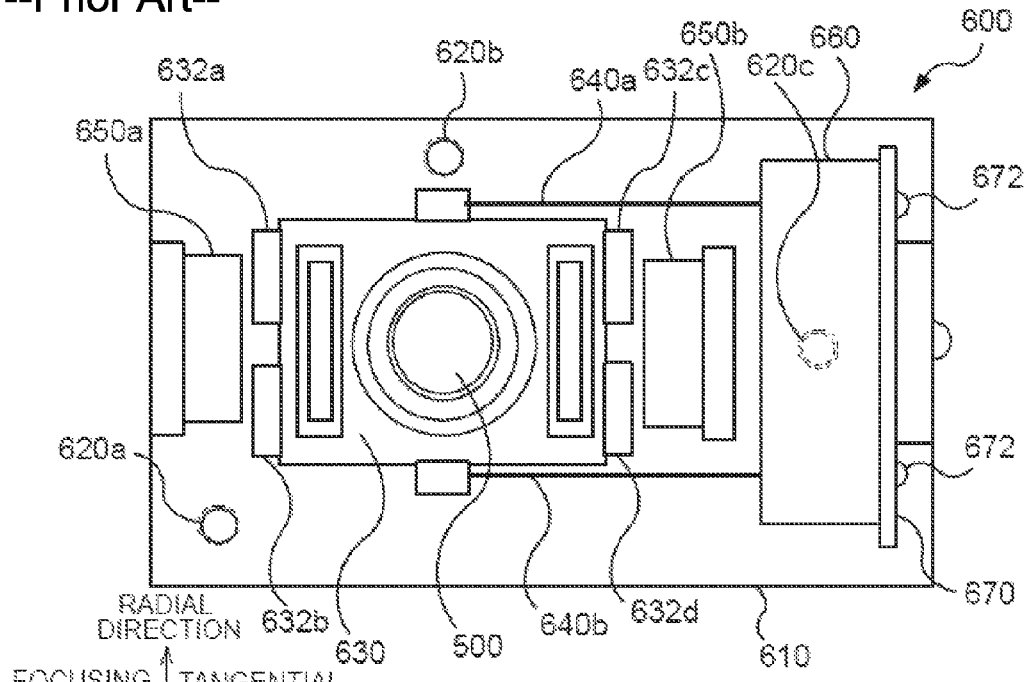
FIG. 23A is a plan view of an actuator viewed from a focusing direction.
Figure 23B:
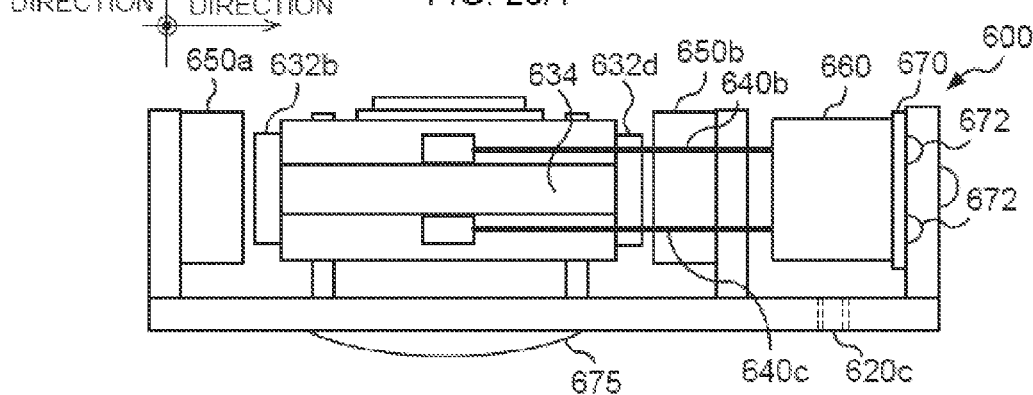
FIG. 23B is a side view of the actuator viewed from a radial direction.
Figure 23C:
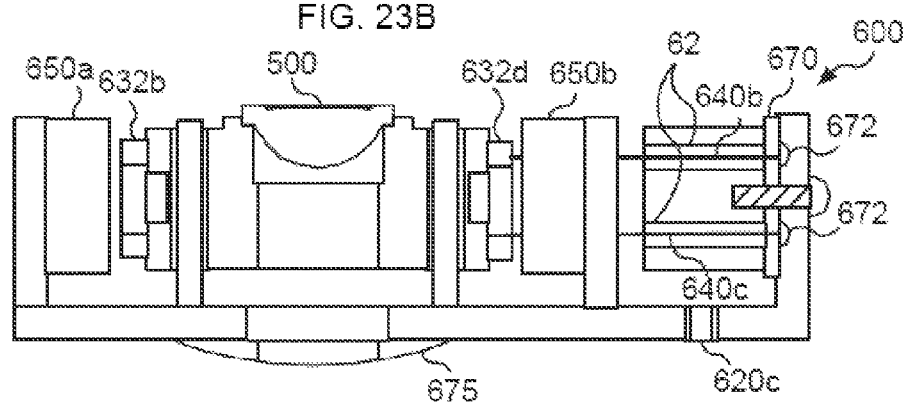
FIG. 23C is a sectional view of the actuator viewed from the radial direction.

The actuator assembly step (S72) of the present invention is the same as the conventional step (S192) described earlier with reference to FIGS. 23A to 23C. That is, the actuator 600 is finally assembled, as shown in FIGS. 23A to 23C, which includes at least the lens holder 630 holding the objective lens 100 such that the edge surface S thereof is disposed on a lens receiving surface and which drives the objective lens 100. Naturally, a lens mounted on the lens holder 630 is not the conventional objective lens 500, but either the objective lens 100a of type A or the objective lens 100c of type C of the objective lens 100 according to the present invention. The same will apply to the subsequent steps.

Actuator Mounting Step (S73)

Figure 24:
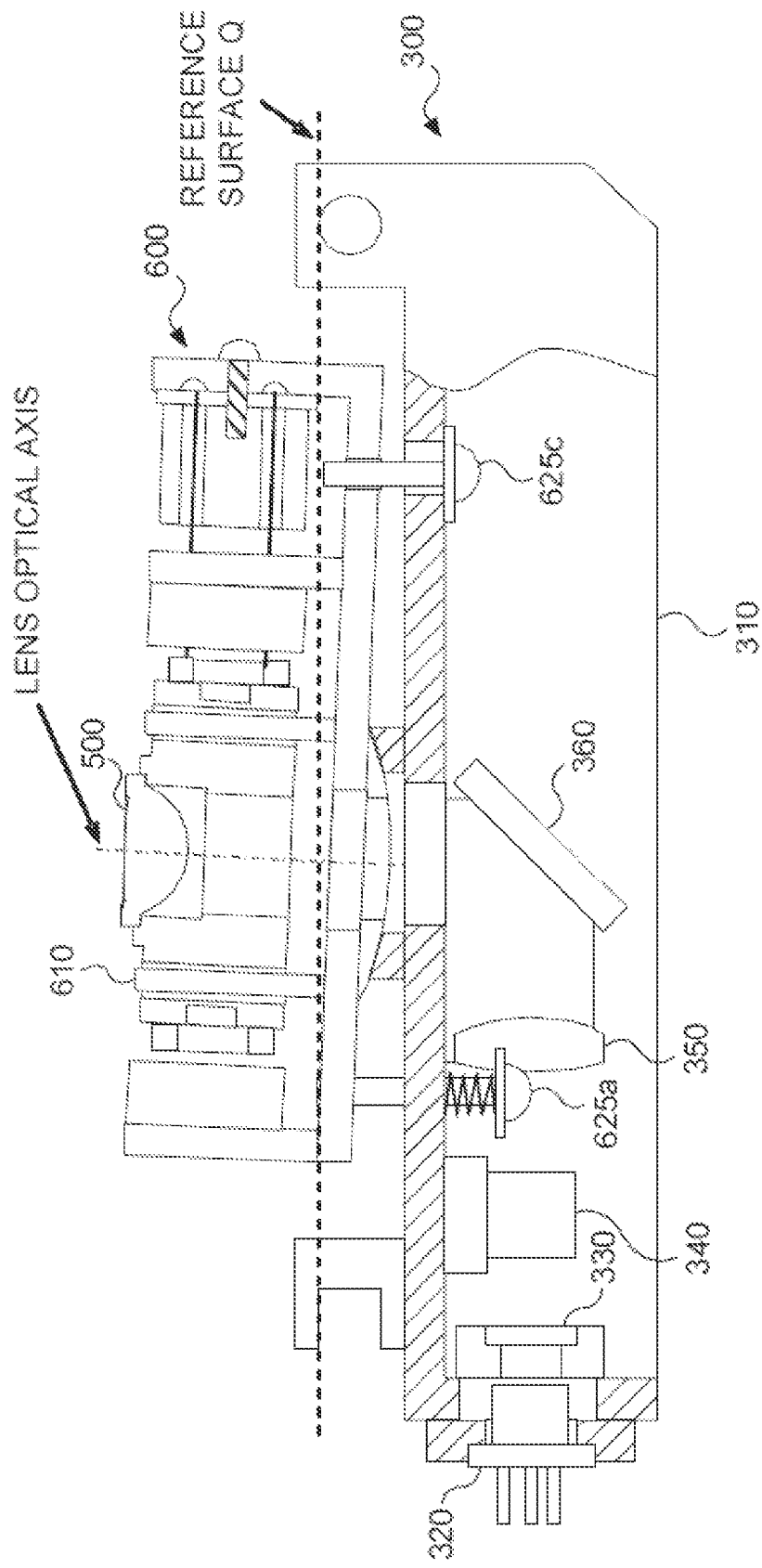
FIG. 24 is an explanatory view of a step of mounting the actuator on the optical block.

The actuator mounting step (S73) of the present invention is the same as the conventional step (S192) described earlier with reference to FIG. 24. That is, the yoke base 610 of the actuator 600 is finally screwed to the housing 310 of the optical block 300 having a tilt relative to the reference surface Q, by using the three skew screws 625a to 625c.

Actuator Tilt Adjustment Step (S74)

Figure 25:
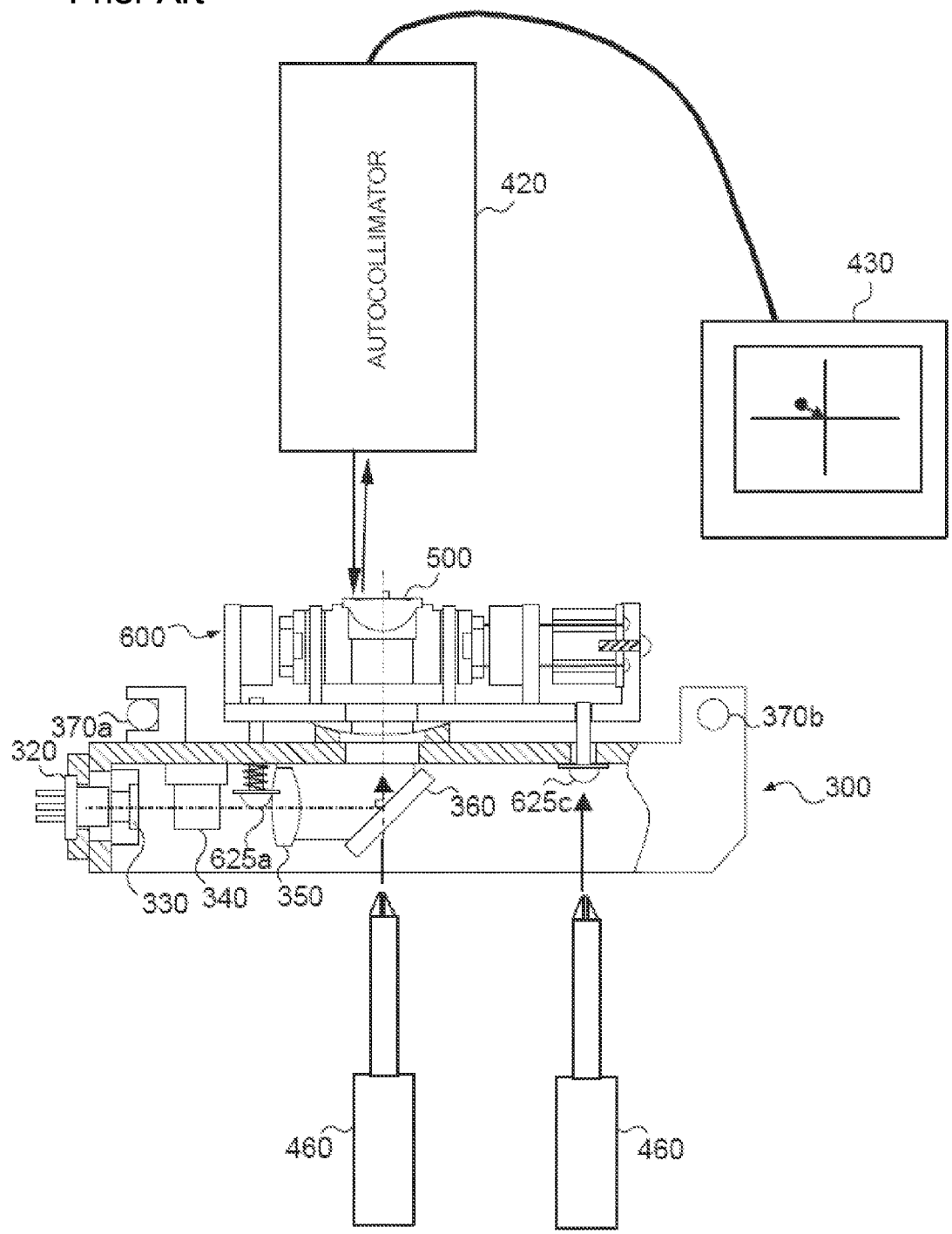
FIG. 25 is an explanatory view of an actuator tilt adjustment step.
Figure 26:
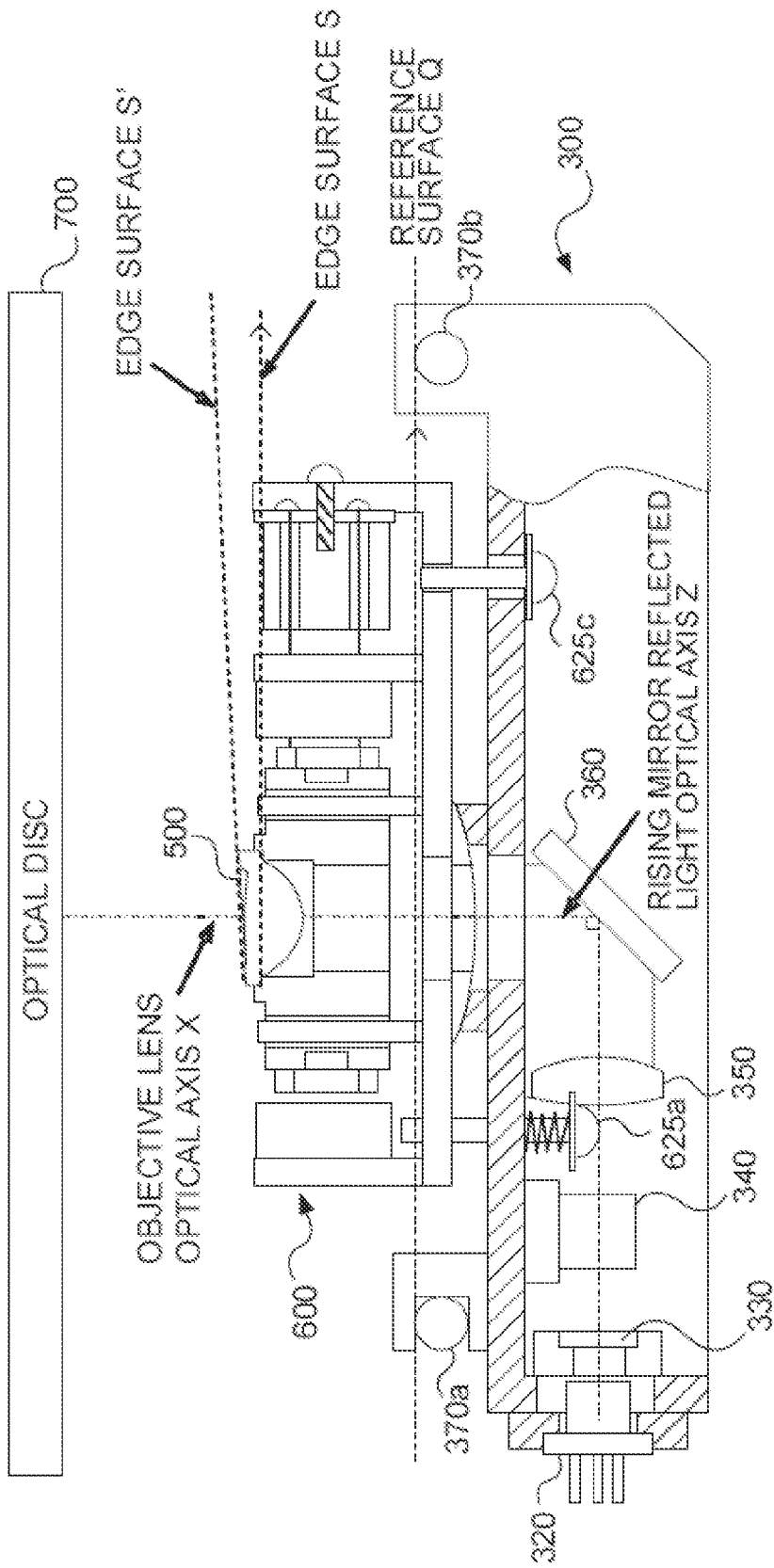
FIG. 26 is an explanatory view of a conventional actuator tilt readjustment step using a jitter value.
Figure 27:
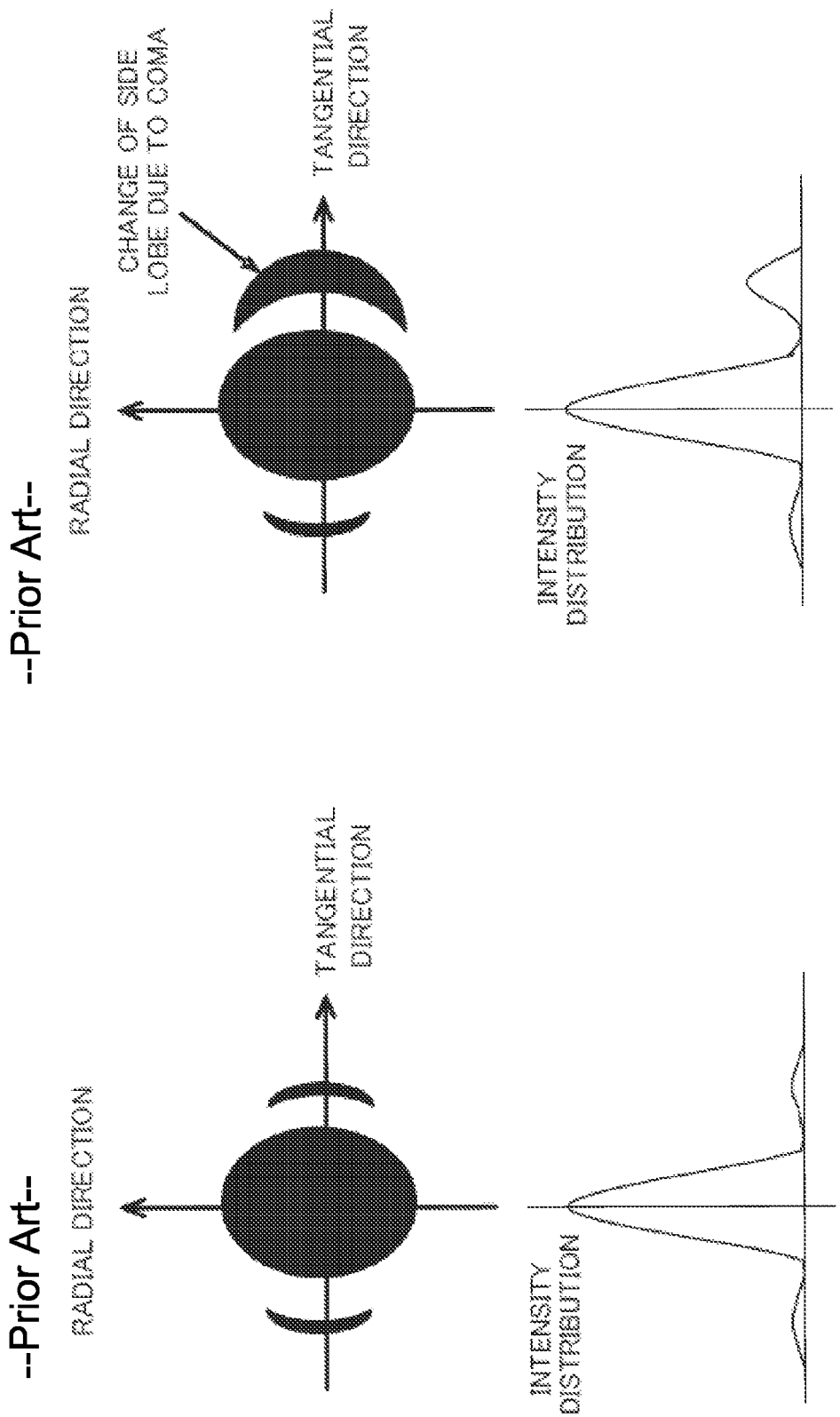
FIG. 27A is an explanatory view of a conventional actuator tilt readjustment step using a spot shape.
FIG. 27B is another explanatory view of the conventional actuator tilt readjustment step using the spot shape.
Figure 28:
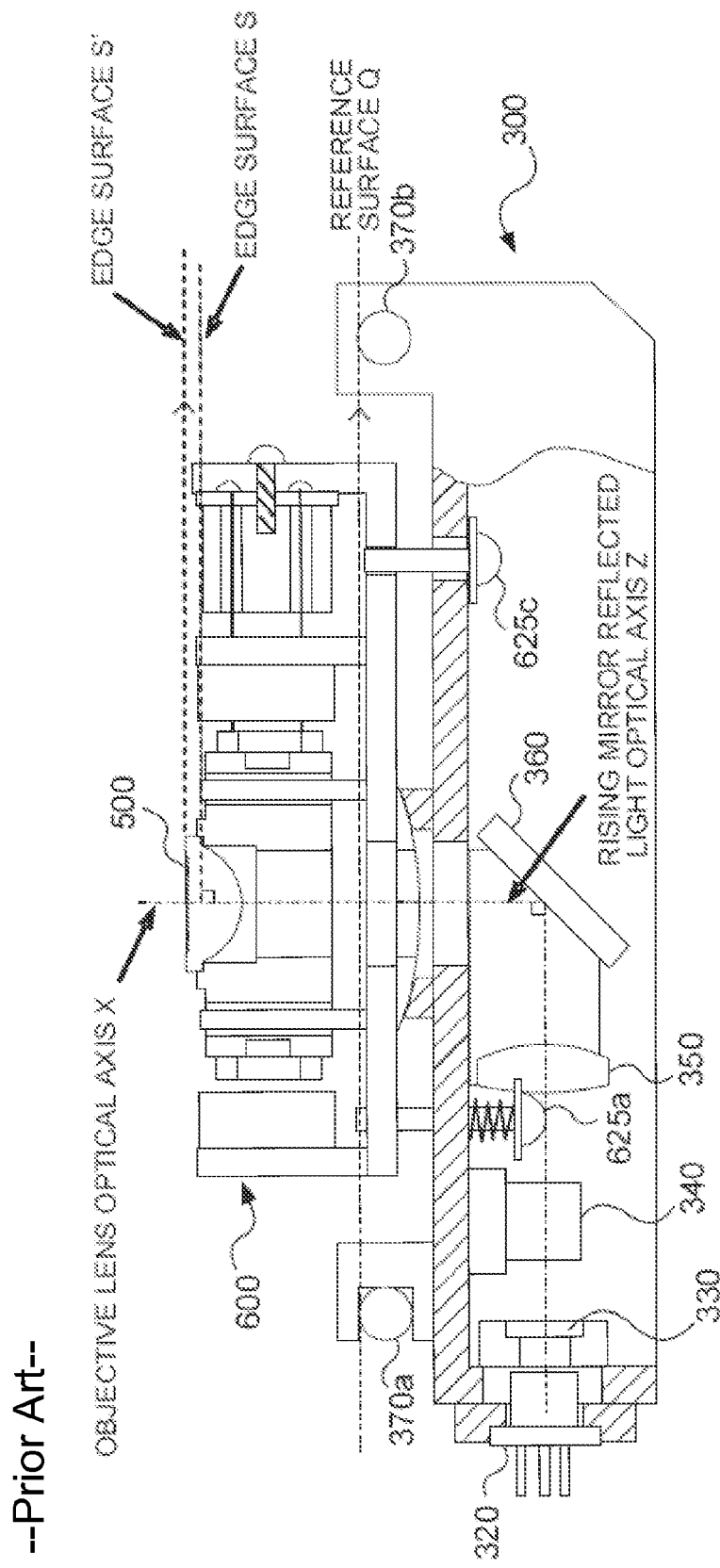
FIG. 28 depicts a result of the tilt adjustment of a conventional objective lens of type A.

The actuator tilt adjustment step (S74) of the present invention is the same as the conventional step (S194) described earlier with reference to FIG. 25. That is, laser light from the autocollimator 420 is applied to the disc-side edge surface S' of the objective lens 100 to check the tilt of reflected light from the disc-side edge surface S'. The tilt of the actuator 600 is adjusted by turning the skew screws 625b and 625c with the screwdriver 460 so that an image of the reflected light lies at the origin point of the monitor 430. As a result, the disc-side edge surface S' of the objective lens 100 held in the lens holder 630 becomes parallel to the reference surface Q.

Figure 29:
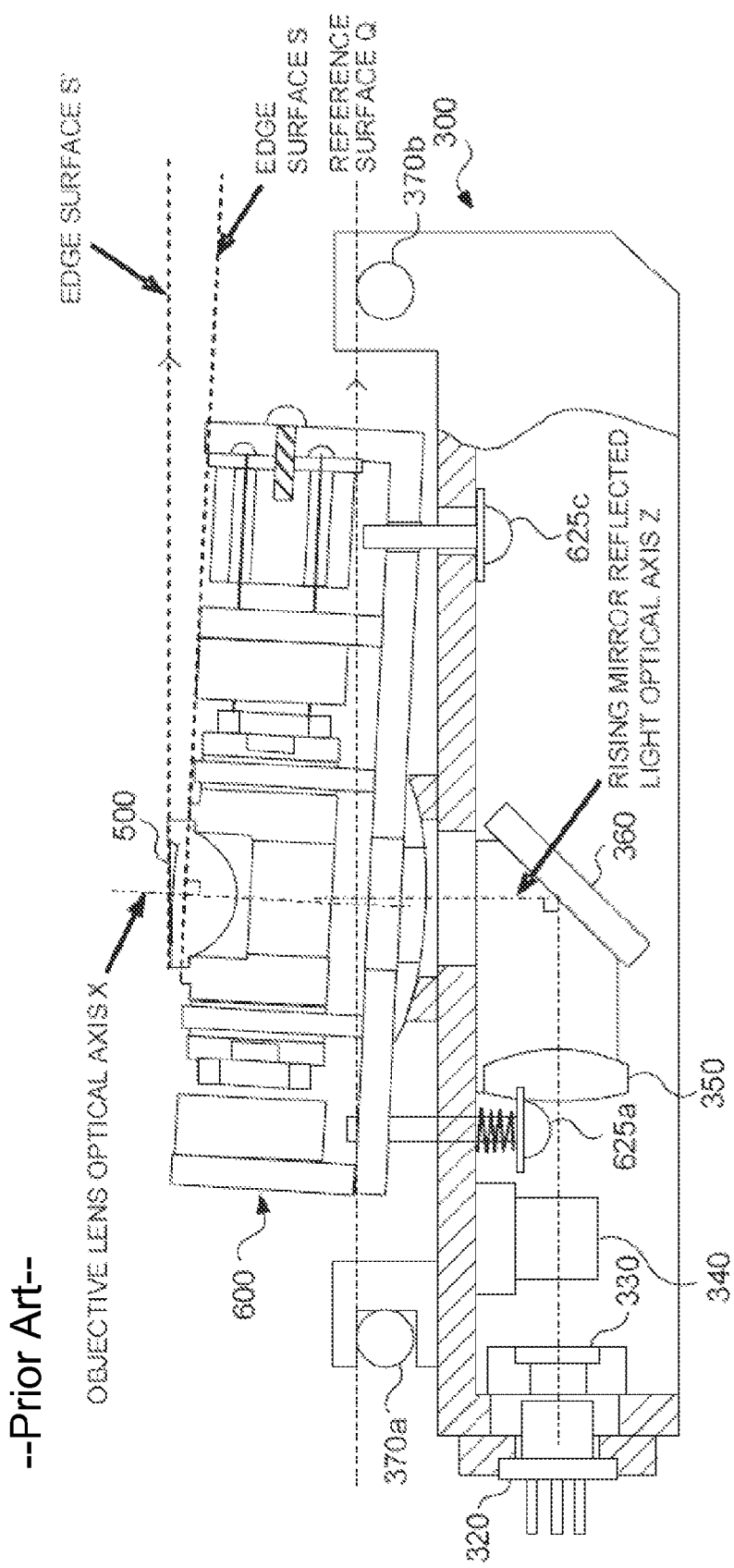
FIG. 29 depicts a result of the tilt adjustment of a conventional objective lens of type B.

However, since the objective lens 100 is designed using the disc-side edge surface S' as the mounting reference surface in the present invention, the result of the tilt adjustment of the actuator 600 for the objective lens 100c whose source-side edge surface S and disc-side edge surface S' are not parallel to each other is different from the result for the conventional objective lens 500b described earlier with reference to FIG. 29. The result of the tilt adjustment of the actuator 600 will hereinafter be described separating the case of the objective lens 100a of type A and the case of the objective lens 100c of type C. In the following symbols, "∥" is representative of being parallel, "⊥" is representative of being orthogonal, and "≠" is representative of being not parallel.

Figure 8:
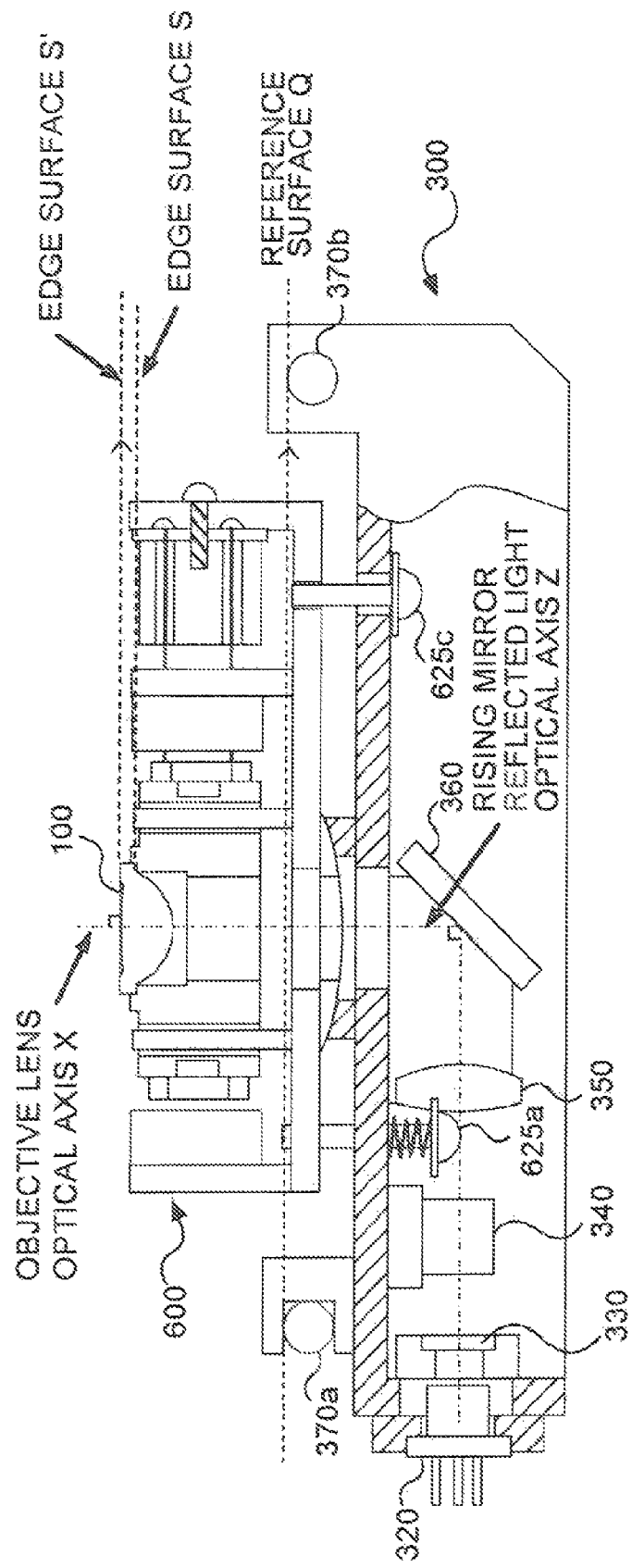
FIG. 8 depicts a result of tilt adjustment of the objective lens of type A according to the present invention.
Figure 9:
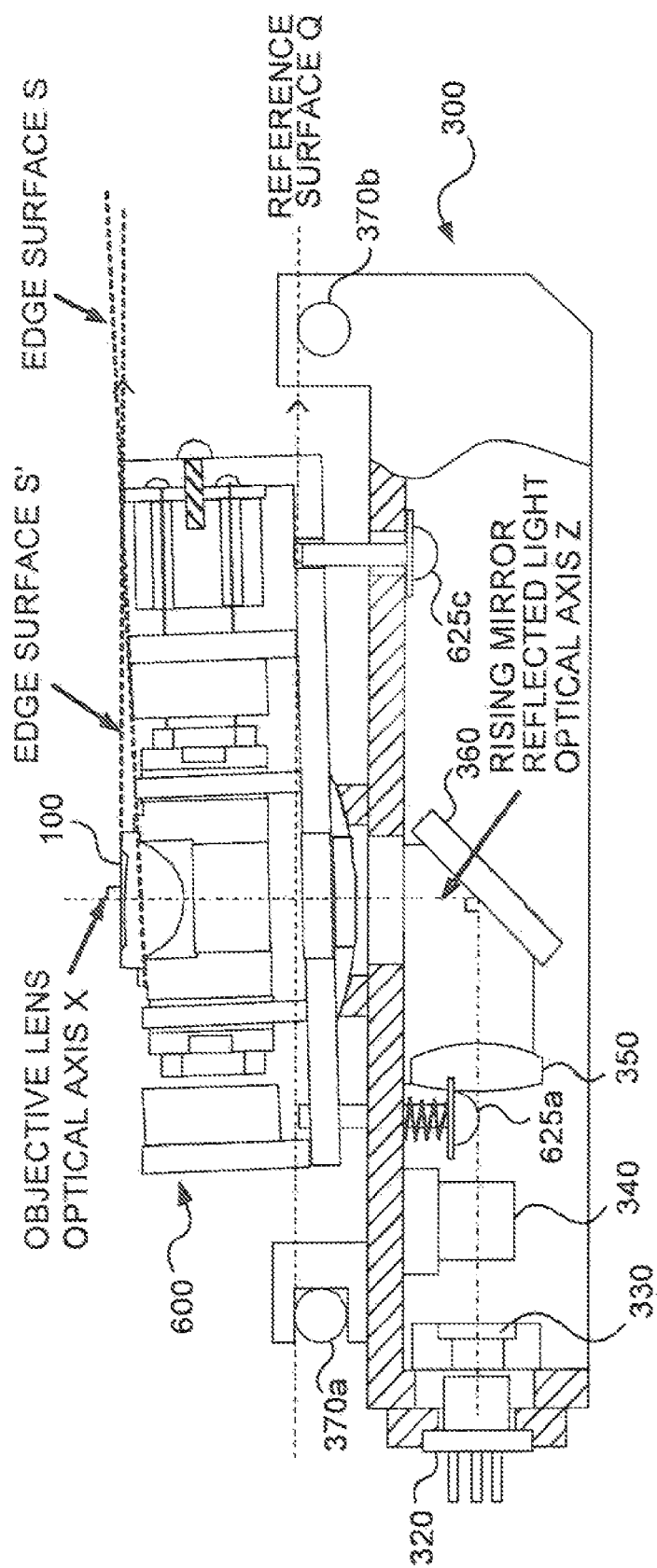
FIG. 9 depicts a result of tilt adjustment of the objective lens of type C according to the present invention.

In the case of the objective lens 100a of type A, the disc-side edge surface S' and the source-side edge surface S are parallel to each other, with the lens optical axis X being orthogonal to the disc-side edge surface S'. By performing the rising mirror reflected light optical axis tilt adjustment step (S71), the rising mirror reflected light optical axis Z becomes orthogonal to the reference surface Q, while by performing the tilt adjustment step (S74) of the actuator 600, the disc-side edge surface S' becomes parallel to the reference surface Q. As a result, as shown in FIG. 8, the lens optical axis X and the rising mirror reflected light optical axis Z become parallel to each other, whereupon the aberration of outgoing light from the objective lens 100a can be within specification.

i) Objective lens of type A→disc-side edge surface S' ∥ source-side edge surface S
ii) Lens design principle→lens optical axis X ⊥ disc-side edge surface S'
iii) LD position adjustment→rising mirror reflected light optical axis Z ⊥ reference surface Q
iv) Actuator tilt adjustment→disc-side edge surface S' ∥ reference surface Q
∴ Lens optical axis X ∥ rising mirror reflected light optical axis Z On the contrary, in the case of the objective lens 100c of type C, the disc-side edge surface S' and the source-side edge surface S are not parallel to each other, with the lens optical axis X being orthogonal to the disc-side edge surface S'. By performing the rising mirror reflected light optical axis tilt adjustment step (S71), the rising mirror reflected light optical axis Z becomes orthogonal to the reference surface Q, while by performing the tilt adjustment step (S74) of the actuator 600, the disc-side edge surface S' becomes parallel to the reference surface Q. As a result, as shown in FIG. 9, the source-side edge surface S tilts relative to the reference surface Q and is not orthogonal to the rising mirror reflected light optical axis Z, but the lens optical axis X becomes parallel to the rising mirror reflected light optical axis Z, allowing the aberration of outgoing light from the objective lens 100c to fall within specification.

i) Objective lens of type C→disc-side edge surface S' ≠ source-side edge surface S
ii) Lens design principle→lens optical axis X ⊥ disc-side edge surface S'
iii) LD position adjustment→rising mirror reflected light optical axis Z ⊥ reference surface Q
iv) Actuator tilt adjustment→disc-side edge surface S' ∥ reference surface Q
∴ Lens optical axis X ∥ rising mirror reflected light optical axis Z In this manner, even though the objective lens 100 conforms to the lens design principle, due to no restrictions imposed on the tilt of the disc-side edge surface S' relative to the source-side edge surface S, the objective lens 100a of type A having the source-side edge surface S and the disc-side edge surface S' that are parallel to each other or the objective lens 100c of type C having the source-side edge surface S and the disc-side edge surface S' that are not parallel to each other, may be shipped.

Thus, in the actuator tilt adjustment step (S74) of the assembly process of the optical pickup apparatus mounted with the objective lens 100a or the objective lens 100c, the tilt of the actuator 600 is adjusted using the disc-side edge surface S' since the tilt of the source-side edge surface S cannot be measured by the autocollimator 420. At that time, in both the cases of the objective lenses 100a and 100c, the lens optical axis X and the rising mirror reflected light optical axis Z becomes parallel to each other.

The conventional optical pickup apparatus assembly process therefore includes the actuator tilt adjustment step (S194) followed by a troublesome step of the actuator tilt readjustment step (S195), both to be performed. According to the present invention, however, the conventional actuator tilt readjustment step (S195) does not need to be performed, since the aberration of outgoing light from the objective lens 100a and from the objective lens 100c fall within specification in the actuator tilt adjustment step (S74). This can suppress the manufacturing cost of the optical pickup apparatus.

OTHER EMBODIMENTS

Although the embodiment of the present invention has hereinabove been described, the above description is intended to facilitate the understanding of the present invention, but not intended to limit the present invention. The present invention may variously be changed or modified without departing from its spirit.

For example, the above embodiment is a case where a single objective lens 100 is mounted on a single lens holder 630, but otherwise at least two objective lenses 100 may be mounted on a single lens holder 680. Assumption is made, for example, that the optical pickup apparatus supports two different optical disc standards. Hereinbelow, for the convenience of description, a case of two objective lenses 100 is assumed, where a first objective lens 110 and a second objective lens 120 are mounted on the single lens holder 680.

Note that the first 110 and the second 120 objective lenses conform to the lens design principle of the present invention, and hence disc-side edge surfaces S1' and S2' to be positioned on the lens surface L2 side are used as the mounting reference surface, instead of source-side edge surfaces S1 and S2 to be positioned on the lens surface S1 side used as the mounting reference surface in the conventional art. Therefore, the first objective lens 110 and the second 120 objective lens are a lens of type A or a lens of type C among the five different types of lenses shown in FIGS. 2A to 2E.

Description will be made hereinbelow of an assembly process of the optical pickup apparatus mounted with the first objective lens 110 and the second objective lens 120.

First, in FIG. 7, a procedure from the optical block assembly step (S70) to the rising mirror reflected light optical axis tilt adjustment step (S71) are the same as those in the case of the single objective lens 100 described above.

Figure 10:
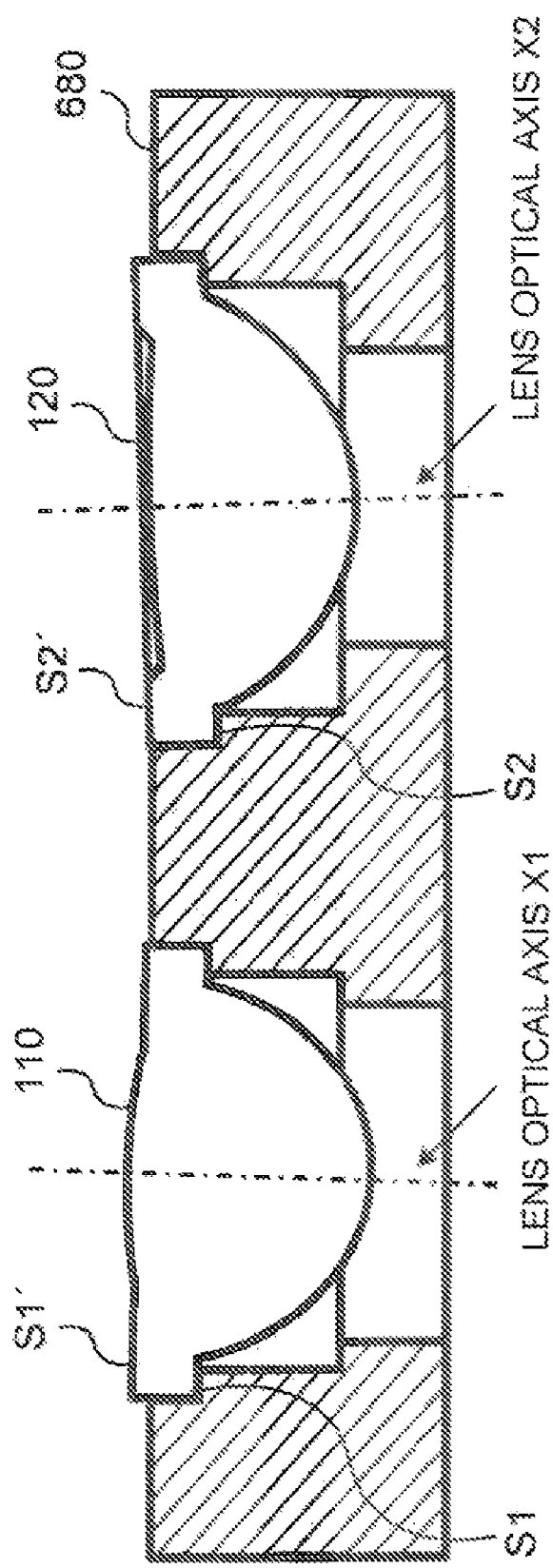
FIG. 10 depicts a lens holder mounted with two, a first and a second objective lenses according to the present invention.

In the next actuator assembly step (S72), the first 110 and the second 120 objective lenses are fitted in the lens holder 680 as shown in FIG. 10. Note that only the first objective lens 110 is adhesively fixed by an adhesive 682, whereas the second objective lens 120 remains fitted in the lens holder 680.

In the next actuator mounting step (S73), the housing 310 of the optical block 300 is screwed by using the three skew screws 625a to 625c to the yoke base 610 of the actuator 600 having the lens holder 680. There is a high possibility that lens optical axis X1 of the first objective 110 and lens optical axis X2 of the second objective lens 120 are neither guaranteed to become parallel to the rising mirror reflected light optical axis Z nor to become parallel to each other, if the housing 310 and the yoke base 610 remain in this merely screwed state.

Figure 11:
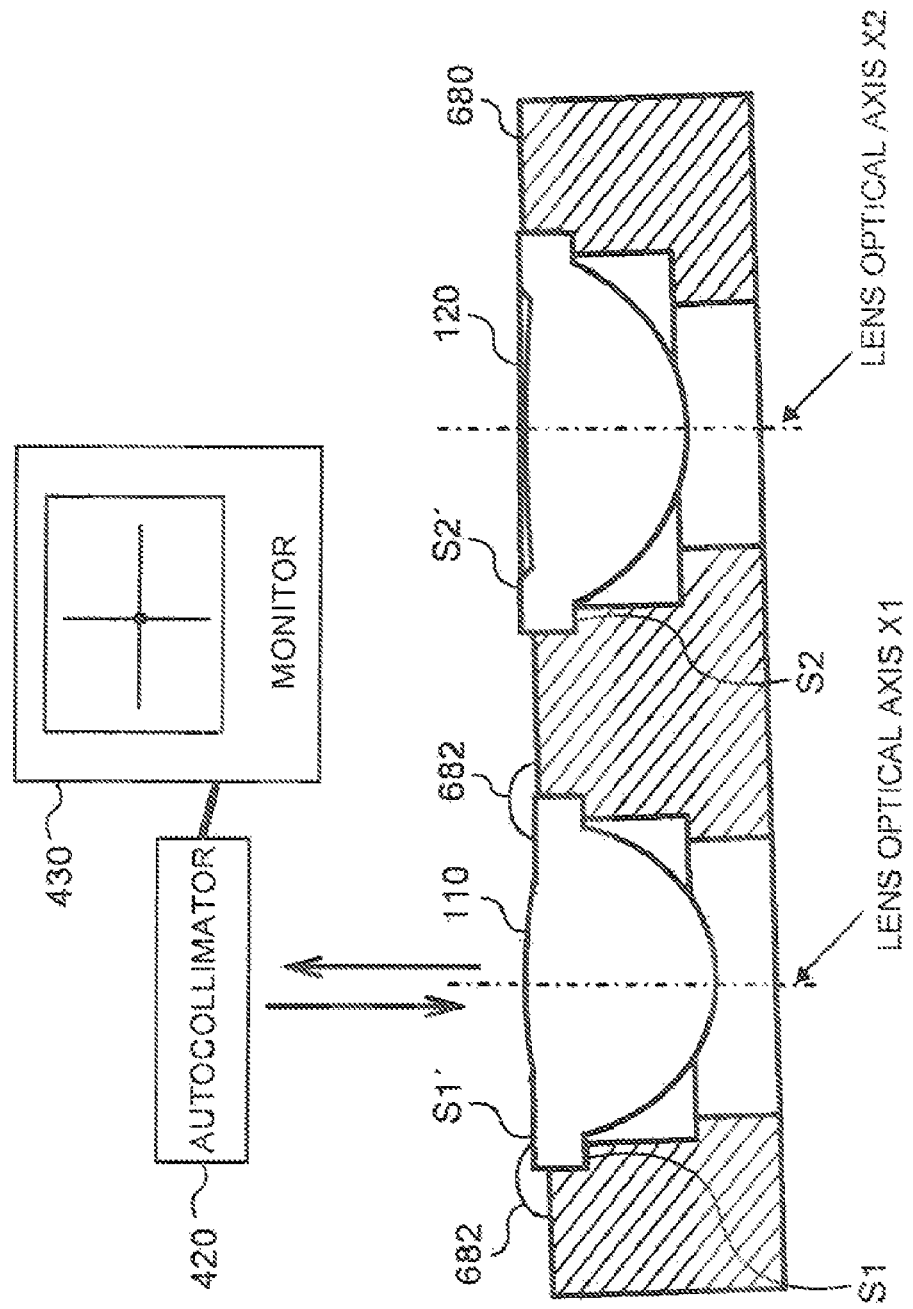
FIG. 11 depicts, tilt adjustment of the first objective lens when mounting the two, the first and the second objective lenses according to the present invention.

Therefore, in the actuator tilt adjustment step (S74), tilt adjustment of the whole lens holder 680 is performed as the tilt adjustment of the first objective lens 110 so that the disc-side edge surface S1' of the first objective lens 110 becomes parallel to the reference surface Q by using the autocollimator 420. As a result, as shown in FIG. 11, the lens optical axis X1 of the first objective lens 110 and the rising mirror reflected light optical axis Z become parallel to each other, allowing the aberration of outgoing light from the first objective lens 110 to fall within specification.

Figure 12:
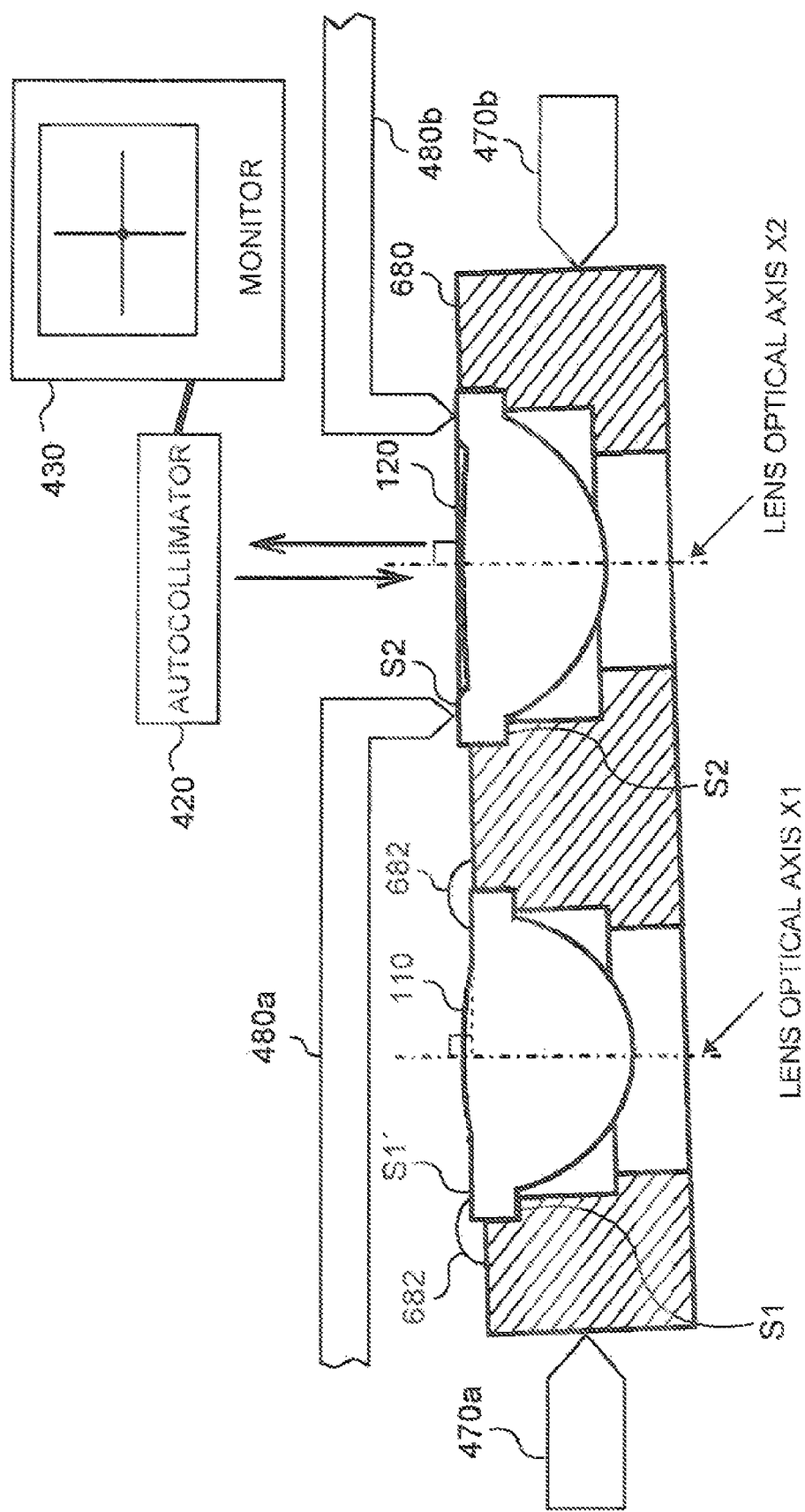
FIG. 12 depicts, tilt adjustment of the second objective lens when mounting the two, the first and the second objective lenses according to the present invention.
Figure 13:
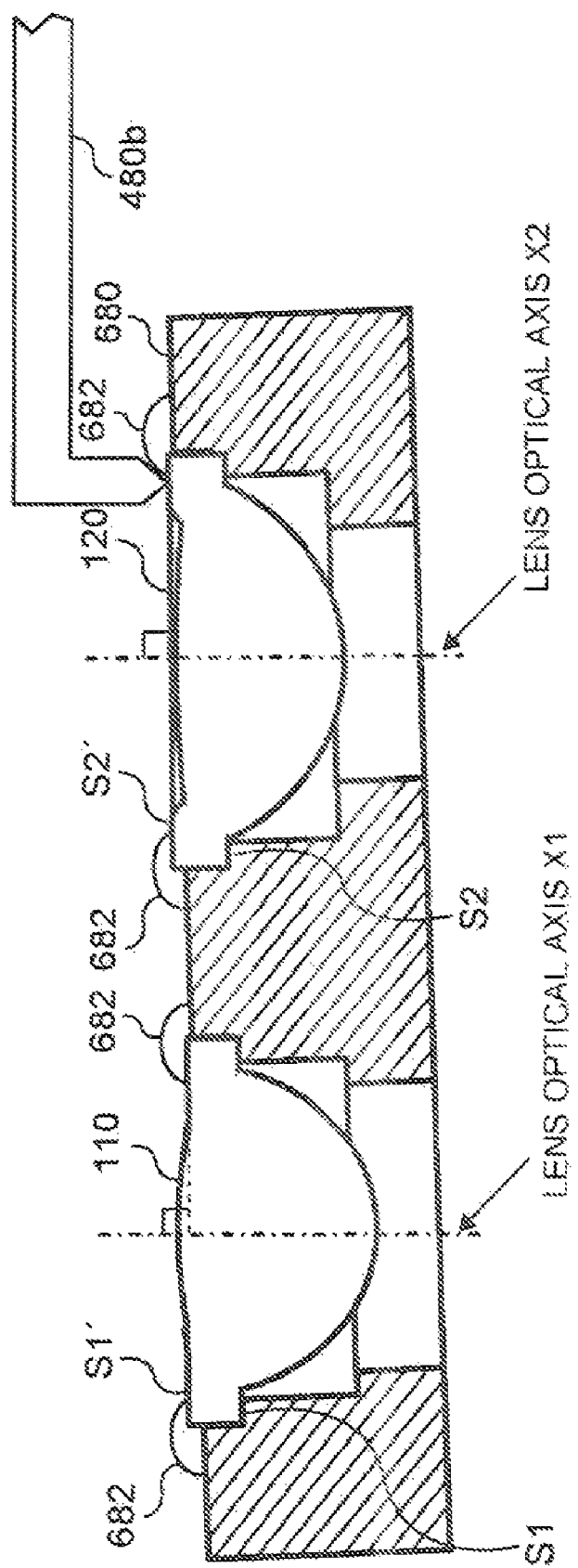
FIG. 13 depicts a state where the tilt adjustment of the two, the first and the second objective lenses according to the present invention has been completed.

Then, as shown in FIG. 12, the current tilt position of the lens holder 680 is kept by holder position jigs 470a and 470b ("a first jig" of the present invention). With the position of the lens holder 680 being kept, the tilt of the second objective lens 120 is then adjusted by lens tilt adjusting pins 480a and 480b ("a second jig" of the present invention). After such an adjustment is performed, the second objective lens 120 and the lens holder 680 are adhesively fixed together by use of the adhesive 682. As a result, the lens optical axis X2 of the second objective lens 120 and the rising mirror reflected light optical axis Z become parallel to each other, allowing the aberration of outgoing light from the second objective lens 120 to fall within specification. That is, at this point of time, as shown in FIG. 13, the aberration of outgoing light of each of the first 110 objective lens and the second 120 objective lens fall within specification, so that the conventional actuator tilt readjustment step (S195) does not need to be performed. Hence, the manufacturing cost of the optical pickup apparatus can be suppressed.

Figure 14A:
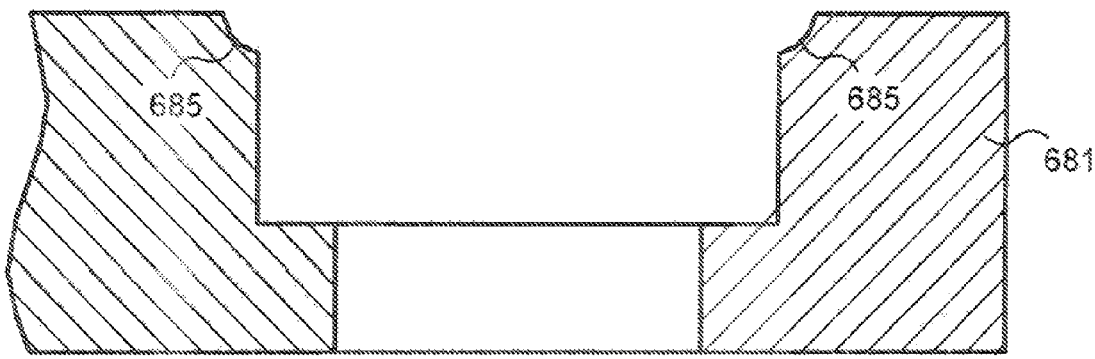
FIG. 14A depicts a lens holder according to another embodiment of the present invention.
Figure 14B:
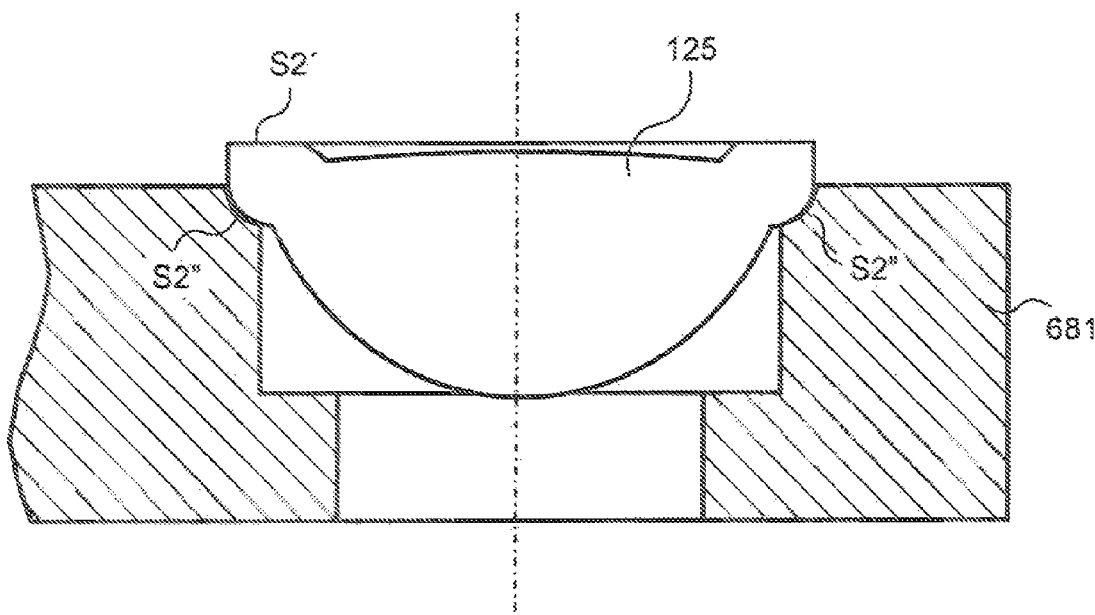
FIG. 14B depicts the second objective lens according to another embodiment of the present invention.
Figure 16A:
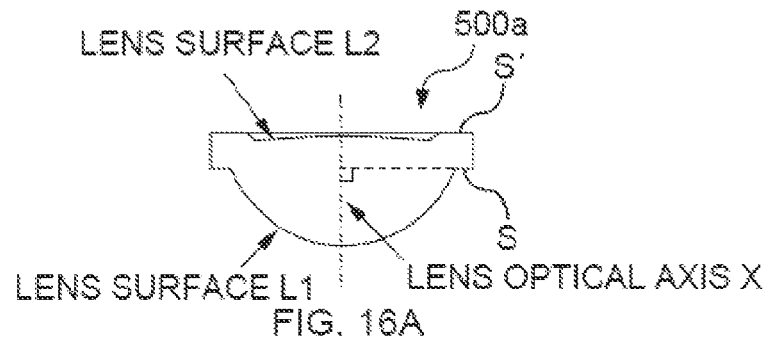
FIG. 16A depicts an objective lens obtained as a result of conventional lens molding.
Figure 16B:
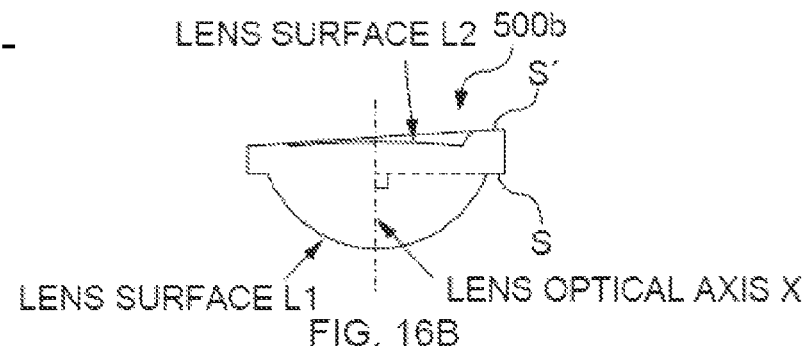
FIG. 16B depicts another objective lens obtained as a result of conventional lens molding.
Figure 16C:
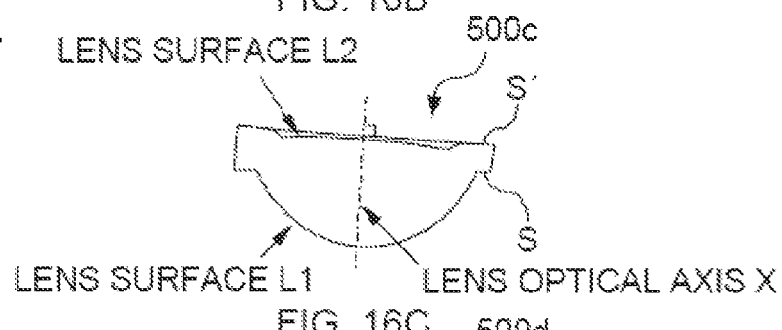
FIG. 16C depicts still another objective lens obtained as a result of conventional lens molding.
Figure 16D:
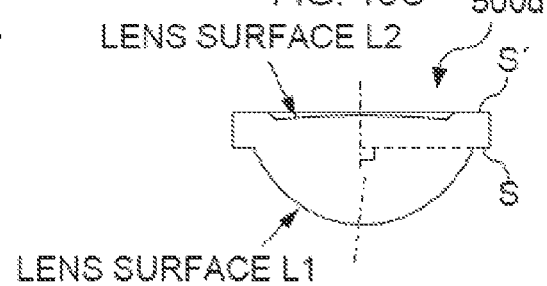
FIG. 16D depicts yet another objective lens obtained as a result of conventional lens molding.
Figure 16E:
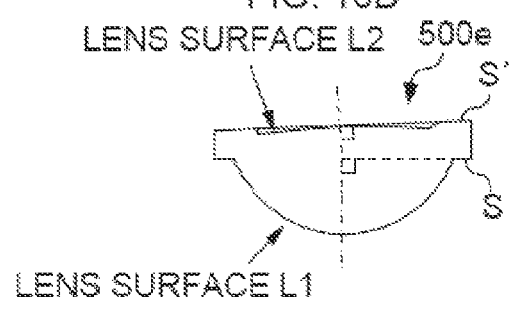
FIG. 16E depicts a further objective lens obtained as a result of conventional lens molding.

By employing a lens holder 681 shaped to provide a concave spherical seat 685 as the lens receiving surface P as shown in FIG. 14A and a second objective lens 125 shaped to provide a convex spherical seat as a source-side edge surface S2", the above tilt adjustment of the second objective lens 125 can easily and accurately be performed using the lens tilt adjusting pins 480a and 480b.

The above embodiments of the present invention are merely for facilitating the understanding of the present invention and are not in any way to be construed as limiting the present invention. The present invention may variously be changed or altered without departing from its spirit and encompasses equivalents thereof.

What is claimed is:

1. A method of manufacturing an optical pickup apparatus including an objective lens focusing light emitted from a light source onto an information surface of an optical disc, the method comprising:

assembling an optical block configured to cause light emitted from the light source to be incident on a first lens surface of an objective lens that includes the first lens surface on a light-source side, a second lens surface on an optical-disc side, a first edge surface provided on an outer region of the first lens surface, and a second edge surface provided in an outer region of the second lens surface, wherein a first optical axis of the first lens surface coincides with a second optical axis of the second lens surface, and wherein the first optical axis and the second optical axis are orthogonal to the second edge surface but not the first edge surface;

adjusting a tilt of the optical block so that an optical axis of light caused to be incident on the first lens surface of the objective lens from the optical block becomes orthogonal to a predetermined reference surface;

assembling an actuator being configured to drive the objective lens, and including a lens holder with a lens receiving surface, the lens holder configured to hold the objective lens such that the first edge surface of the objective lens is placed on the lens receiving surface;

mounting the actuator on the optical block having a tilt relative to the reference surface; and adjusting a tilt of the actuator so that the second edge surface of the objective lens held in the lens holder becomes parallel to the reference surface.

2. The method of manufacturing an optical pickup apparatus of claim 1, wherein a plurality of the objective lenses are held in the lens holder, and wherein the step of adjusting a tilt of the actuator includes:

keeping a tilt of the actuator as a whole with a first jig, the tilt of the actuator as a whole having been adjusted such that the second edge surface of one objective lens out of the plurality of objective lenses becomes parallel to the reference surface; and adjusting a tilt of each objective lens other than the one objective lens with a second jig, in sequence, such that the second edge surface of the each objective lens other than the one objective lens becomes parallel to the reference surface.

3. The method of manufacturing an optical pickup apparatus of claim 2, wherein the first edge surface of the each objective lens other than the one objective lens is shaped into a convex spherical seat, and wherein the lens receiving surface of the lens holder, on which the first edge surface of the each objective lens other than the one objective lens is to be placed, is shaped into a concave spherical seat.

* * * * *